(12) United States Patent
King et al.

(10) Patent No.: US 10,484,513 B2
(45) Date of Patent: *Nov. 19, 2019

(54) SYSTEM, METHOD, AND COMPUTER PROGRAM PRODUCT FOR CONNECTING OR COUPLING AUDIO COMMUNICATIONS SYSTEMS OVER A SOFTWARE DEFINED WIDE AREA NETWORK

(71) Applicant: NSGDatacom Inc., Chantilly, VA (US)

(72) Inventors: Graham King, Clifton, VA (US); Simon Tiley, Chantilly, VA (US)

(73) Assignee: NSGDatacom, Inc., Chantilly, VA (US)

( * ) Notice: Subject to any disclaimer, the term of this patent is extended or adjusted under 35 U.S.C. 154(b) by 31 days.

This patent is subject to a terminal disclaimer.

(21) Appl. No.: 15/947,788

(22) Filed: Apr. 7, 2018

(65) Prior Publication Data
US 2018/0227394 A1    Aug. 9, 2018

Related U.S. Application Data

(63) Continuation-in-part of application No. 14/801,833, filed on Jul. 17, 2015, now Pat. No. 9,986,101.

(51) Int. Cl.
*H04W 4/00* (2018.01)
*H04L 29/06* (2006.01)
(Continued)

(52) U.S. Cl.
CPC ............ *H04L 69/08* (2013.01); *G10L 19/02* (2013.01); *H04L 69/04* (2013.01); *H04L 69/324* (2013.01)

(58) Field of Classification Search
CPC .............. H04L 67/2861; H04L 67/025; H04L 67/2833; H04L 69/04; H04L 69/324; H04L 69/08; G10L 19/02; G10L 19/167
(Continued)

(56) References Cited

U.S. PATENT DOCUMENTS

| 4,295,008 A | 10/1981 | Johnson et al. |
| 4,303,804 A | 12/1981 | Johnson et al. |
(Continued)

FOREIGN PATENT DOCUMENTS

FR    2898233    9/2007

OTHER PUBLICATIONS

U.S. Appl. No. 11/952,818, filed Dec. 7, 2007.
U.S. Appl. No. 12/270,697, filed Nov. 13, 2008.

*Primary Examiner* — Mang Hang Yeung
(74) *Attorney, Agent, or Firm* — ATFirm PLLC; Ralph P. Albrecht

(57) ABSTRACT

An automated telecommunications system includes a first system that receives audio frequency signals such as PSTN-compatible, voice over IP, or high definition voice, decodes and interprets said incoming signals according to the type and format, and transmits digital messages to a second system over a software defined wide area network (SD-WAN). Said second system receives and interprets digital messages incoming from the first system, encodes and regenerates outgoing audio frequency signals. The system may be bi-directional and operate over a software defined wide area network, such as an IP based wireless or wired data network. The functionality of said first and second systems may be combined at a single location and interface with a conventional PSTN compatible VoIP system or High Definition Voice system at either or both ends and allow PSTN, conventional VoIP and High Definition Voice communications to share the same packet data stream over a SDWAN connection.

38 Claims, 12 Drawing Sheets

(51) Int. Cl.
*G10L 19/02* (2013.01)
*H04L 29/08* (2006.01)

(58) Field of Classification Search
USPC .......................................................... 370/328
See application file for complete search history.

(56) References Cited

U.S. PATENT DOCUMENTS

| | | | |
|---|---|---|---|
| 4,305,149 A | 12/1981 | Harrison | |
| 4,365,112 A | 12/1982 | Ruether et al. | |
| 4,446,454 A | 5/1984 | Pyle | |
| 4,475,190 A | 10/1984 | Marouf et al. | |
| 4,581,606 A | 4/1986 | Mallory | |
| 4,777,474 A | 10/1988 | Clayton | |
| 4,782,485 A | 11/1988 | Gollub | |
| 4,862,452 A | 8/1989 | Milton et al. | |
| 4,942,570 A | 7/1990 | Kotzin et al. | |
| 5,018,136 A | 5/1991 | Gollub | |
| 5,020,098 A | 5/1991 | Celli | |
| 5,027,104 A | 6/1991 | Reid | |
| 5,062,147 A | 10/1991 | Pickett et al. | |
| 5,195,126 A | 3/1993 | Carrier et al. | |
| 5,221,250 A | 6/1993 | Cheng | |
| 5,276,678 A | 1/1994 | Hendrickson et al. | |
| 5,438,607 A | 8/1995 | Przygoda et al. | |
| 5,444,707 A | 8/1995 | Cerna et al. | |
| 5,481,589 A | 1/1996 | Morduch | |
| 5,495,522 A | 2/1996 | Allen et al. | |
| 5,619,564 A | 4/1997 | Canniff et al. | |
| 5,636,292 A | 6/1997 | Rhoads | |
| 5,812,819 A | 9/1998 | Rodwin et al. | |
| 5,838,665 A | 11/1998 | Kahn et al. | |
| 5,862,260 A | 1/1999 | Rhoads | |
| 5,898,673 A | 4/1999 | Riggan et al. | |
| 5,907,547 A | 5/1999 | Foladare et al. | |
| 5,943,343 A | 8/1999 | Hatta et al. | |
| 5,974,043 A | 10/1999 | Solomon | |
| 6,014,441 A | 1/2000 | Mark | |
| 6,028,860 A | 2/2000 | Laubach et al. | |
| 6,035,016 A | 3/2000 | Moore | |
| 6,069,890 A | 5/2000 | White et al. | |
| 6,078,665 A | 6/2000 | Anderson et al. | |
| 6,097,804 A | 8/2000 | Gilbert et al. | |
| 6,131,121 A | 10/2000 | Mattaway et al. | |
| 6,137,793 A | 10/2000 | Gorman et al. | |
| 6,144,670 A | 11/2000 | Sponaugle et al. | |
| 6,192,123 B1 | 2/2001 | Grunsted et al. | |
| 6,295,346 B1 | 9/2001 | Markowitz et al. | |
| 6,335,927 B1 | 1/2002 | Elliott et al. | |
| 6,369,705 B1 | 4/2002 | Kennedy | |
| 6,370,555 B1 | 4/2002 | Bartkowiak | |
| 6,377,589 B1 | 4/2002 | Knight et al. | |
| 6,400,265 B1 | 6/2002 | Saylor et al. | |
| 6,532,088 B1 | 3/2003 | Dantu et al. | |
| 6,542,739 B1 | 4/2003 | Garner | |
| 6,614,781 B1 | 9/2003 | Elliott et al. | |
| 6,661,340 B1 | 12/2003 | Saylor et al. | |
| 6,731,649 B1 | 5/2004 | Silverman | |
| 6,738,351 B1 | 5/2004 | Qureshi et al. | |
| 6,757,276 B1 | 6/2004 | Harper et al. | |
| 6,862,622 B2 | 3/2005 | Jorgensen | |
| 7,020,128 B1 | 3/2006 | Gladden et al. | |
| 7,106,843 B1 | 9/2006 | Gainsboro et al. | |
| 7,154,914 B1 | 12/2006 | Pechner et al. | |
| 7,180,892 B1 | 2/2007 | Tackin | |
| 7,187,926 B1 | 3/2007 | Henkel | |
| 7,253,728 B2 | 8/2007 | Johan et al. | |
| 7,313,150 B2 | 12/2007 | Naudot et al. | |
| 7,508,816 B1 | 3/2009 | Everson et al. | |
| 7,796,293 B2 | 9/2010 | Fujishige et al. | |
| 8,094,679 B2 | 1/2012 | King | |
| 8,325,693 B2 | 12/2012 | Hazani et al. | |
| 8,416,769 B2 | 4/2013 | Lewis | |
| 8,483,245 B2 | 7/2013 | Madhavan et al. | |
| 8,509,223 B2 | 8/2013 | Mehta et al. | |
| 8,509,391 B2 | 8/2013 | Elliot et al. | |
| 8,510,416 B2 | 8/2013 | Johan et al. | |
| 8,520,670 B1 | 8/2013 | Giniger et al. | |
| 8,526,909 B2 | 9/2013 | Sennett et al. | |
| 8,531,286 B2 | 9/2013 | Friar et al. | |
| 8,571,993 B2 | 10/2013 | Kocher et al. | |
| 8,687,650 B2 | 4/2014 | King | |
| 9,986,101 B2 * | 5/2018 | King | H04L 65/605 |
| 2001/0008556 A1 | 7/2001 | Bauer et al. | |
| 2002/0101854 A1 | 8/2002 | Siegrist et al. | |
| 2002/0150081 A1 | 10/2002 | Fang | |
| 2004/0037214 A1 | 2/2004 | Claret et al. | |
| 2004/0141484 A1 | 7/2004 | Rogalski et al. | |
| 2004/0248593 A1 | 12/2004 | Hicks et al. | |
| 2005/0105508 A1 | 5/2005 | Saha | |
| 2005/0174935 A1 | 8/2005 | Segel | |
| 2006/0034255 A1 | 2/2006 | Benning et al. | |
| 2006/0098619 A1 | 5/2006 | Nix et al. | |
| 2006/0221983 A1 | 10/2006 | Cavgalar et al. | |
| 2007/0183317 A1 | 8/2007 | Vasseur | |
| 2007/0263598 A1 | 11/2007 | Chen et al. | |
| 2008/0005156 A1 | 1/2008 | Edwards et al. | |
| 2008/0056469 A1 | 3/2008 | Preston et al. | |
| 2008/0212619 A1 | 9/2008 | Scott et al. | |
| 2008/0285594 A1 | 11/2008 | Ray et al. | |
| 2009/0147690 A1 * | 6/2009 | King | H04L 45/22 370/245 |
| 2009/0257345 A1 * | 10/2009 | King | H04L 41/22 370/216 |
| 2010/0296508 A1 | 11/2010 | Lewis | |
| 2012/0113804 A1 | 1/2012 | Zhang | |
| 2012/0106543 A1 * | 5/2012 | King | H04L 45/22 370/352 |
| 2013/0247128 A1 | 9/2013 | Hinchliffe et al. | |
| 2017/0019537 A1 | 1/2017 | King et al. | |

\* cited by examiner

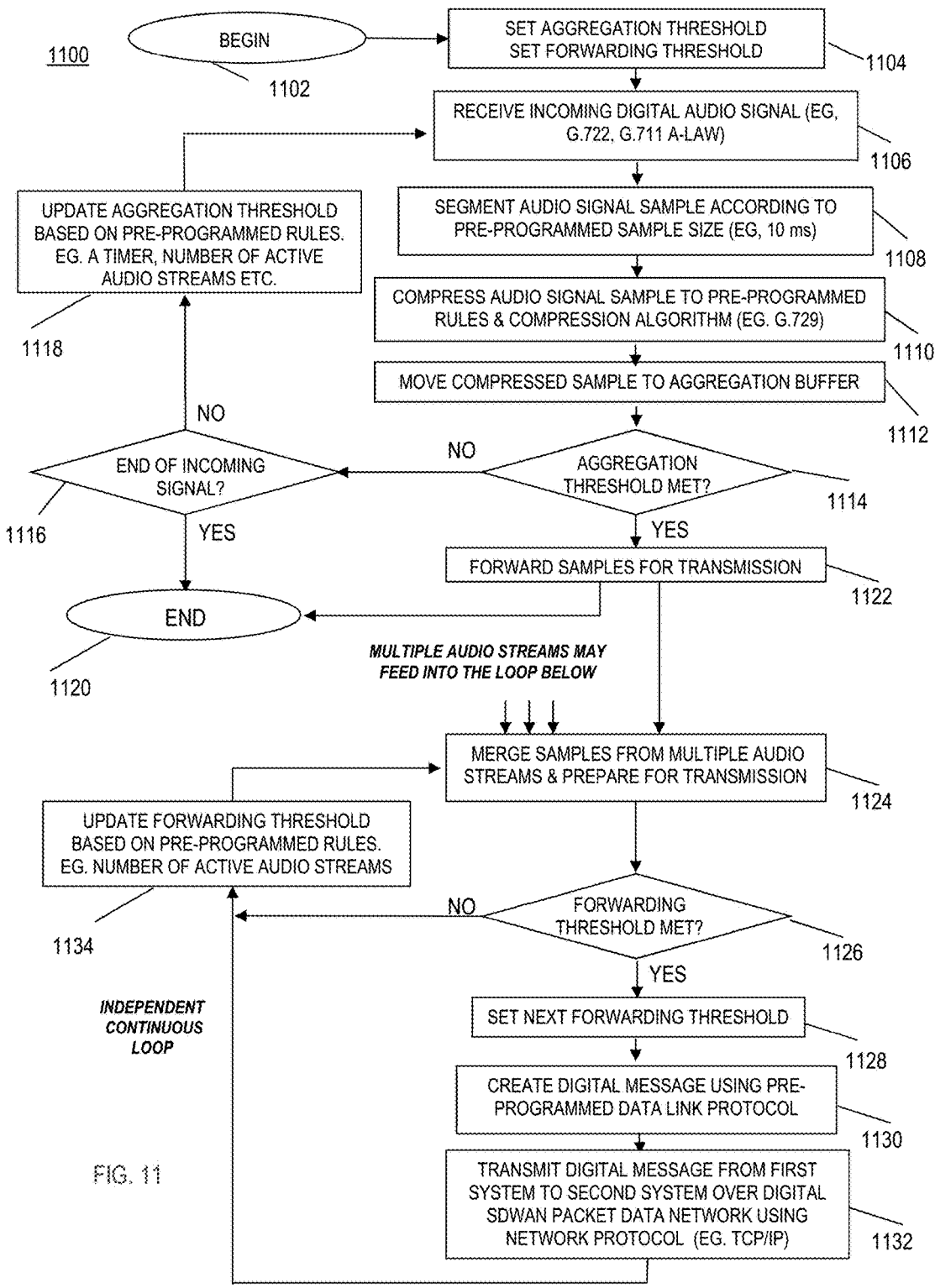

SYSTEM, METHOD, AND COMPUTER PROGRAM PRODUCT FOR CONNECTING OR COUPLING AUDIO COMMUNICATIONS SYSTEMS OVER A SOFTWARE DEFINED WIDE AREA NETWORK

This Application is a continuation-in-part of, and claims priority under 35 Section 120 to, and the benefit of U.S. patent application Ser. No. 14/801,833, filed Jul. 17, 2015, to King and Tiley, entitled, "A SYSTEM, METHOD, AND COMPUTER PROGRAM PRODUCT FOR CONNECTING OR COUPLING ANALOG AUDIO COMMUNICATIONS SYSTEMS OVER A WIRELESS PACKET DATA NETWORK," the contents of which is incorporated herein by reference in its entirety.

BACKGROUND OF DISCLOSURE

Field of the Disclosure

The present invention relates generally to the transmission of audio-based communications such as voice, fax and dial modem transmission over a packet data network, and more particularly to Software Defined Wide Area Network (SD-WAN) communications.

Related References

Many older 'legacy' telecommunications systems use dial-up telephone lines for voice calls, calls between facsimile machines and calls between analog dial-up modems. Over recent years dial-up telephone lines have been gradually replaced by cell-phone connections and more recently still by IP data packet connections, such as provided by broadband Internet Service Providers (ISPs). It is desirable that eventually analog telephone lines will be completely replaced by IP based data packet connections which will comprise a combination of 'conventional' Voice over IP (VoIP) services and High Definition Voice services delivered over satellite, terrestrial fiber and cable connections in addition to wireless and new cellular wireless services based on the long term evolution (LTE) standard also known as 4G, 5G or 6G and beyond.

Except for a few plans limited in both availability and capability, the conventional 4G LTE data services currently being offered by the Cellular Wireless carriers do not support the majority of cell phone voice traffic. 'Standard' cell-phone voice calls are placed over the established 3G wireless infrastructures, whereas only data connections (such as Web browsing or computer application or 'app' based connections) are supported by the 4G LTE data service. In other words, most if not all conventional 4G cell phone services do not combine conventional telephone voice calls with data calls over the same data packet infrastructure. It is desirable that the next step in 4G evolution include enabling convergence of voice and data services over a common packet based architecture. Unfortunately, conventional systems often fall short in being able to support such convergence.

Moving voice calls from 3G to the common packet based infrastructure of 4G and beyond presents a number of technical challenges. For most business users, current cell-phone voice quality is not good enough to become a viable replacement to the Public Switched Telephone Network (PSTN). Although standard cell phone quality is generally considered not good enough to become part of future LTE, service providers are constrained by the fact that audio standards must be compatible with the PSTN to which much of the world is still connected. Ideally, for cellular wireless to be an acceptable alternative to copper for last mile connectivity, the quality of voice calls should be virtually indistinguishable from the quality currently possible from a good landline connection. Better still would be higher quality IP based voice or "High Definition Voice" (wideband) services, which currently only operate within controlled IP network environments.

Within the communications industry, the generic term VoIP is used to encompass both High Definition Voice systems as well as PSTN compatible VoIP systems. Herein we sometimes use the term "VoIP" or "conventional VoIP" to draw a distinction between VoIP systems that use PSTN compatible standards or "narrow band" audio, and those VoIP systems that use High Definition Voice wideband audio standards not directly compatible with the PSTN. This distinction between conventional VoIP and High Definition Voice Systems is intended not to be limiting, but rather exemplary in nature to clarify the examples being presented. A person skilled in the relevant art will recognize that in some cases the use of the term VoIP herein includes both PSTN-compatible VoIP systems and High Definition Voice systems in addition to any other type of VoIP system that may use a real time stream of data packets to transport the audio across an IP network. The use of each term individually should be taken as in no way limiting the invention in scope or applicability.

The use of conventional VoIP solutions over LTE connections is also problematic. Conventional, uncompressed VoIP when used over a broadband connection should theoretically be indistinguishable from a normal analog telephone call. When a service provider controls resources of the end-to-end connection for VoIP calls this is generally the case. However, it is also a common user experience that packet delays, dropped packets and other IP introduced artifacts can easily degrade VoIP calls to the point where they become unusable. This is more likely to occur when the loading on the network varies and resources for each and every VoIP call are not reserved and protected. For example, over a public IP network such as the Internet where network resources are contended and allocated in real time, there is the possibility that a momentary overload could block passage of even the highest priority VoIP traffic. When a large numbers of VoIP calls is being supported over common network connections, the difficulty of maintaining a consistent, high quality on all calls simultaneously is increased. Even broadband terrestrial circuits can exhibit the effects of overload when the number of active VoIP calls increases beyond a certain point. Each call typically generates hundreds of small packets per second, each of which packet is independently subject to delay, discard or error, thereby increasing the likelihood of dropped packets and the introduction of additional jitter and delay into the communications path.

A process commonly used on VoIP calls to counter the degrading effect of IP based network limitations is voice compression. Voice compression has the effect of reducing the bandwidth required to support the audio signal, which can improve consistency and dependability of packet delivery over a congested network. However conventional systems fall short of taking full advantage of such compression.

The digital audio stream generated by the PSTN normally conforms to the G.711 standard and can have a digital data rate of 64 Kbps. G.711 is the standard used by the digital hierarchy of the PSTN, sometimes known as full rate voice, or toll quality voice. In uncompressed conventional VoIP applications where direct compatibility with the PSTN is maintained, the packet network effectively performs the same connection function for the G.711 audio stream as a standard digital telephone network. The primary difference is that the packet network introduces a transmission delay that varies from packet to packet. This variation in delay is known as jitter. Buffers in the end-point VoIP devices absorb jitter to some extent, but there is always a trade-off between the magnitude of jitter that can be absorbed and the delay that can be tolerated by users.

For any packet-based connection, if the packet delay exceeds the depth of the jitter buffer, even for a short period, then the missing or 'late' packets will create temporary gaps in the audio. The problem may be exemplified by broadband WAN connections supporting a mixture of applications where the VoIP traffic uses only a tiny percentage of the network capacity, generally considered to be of no consequence to the overall loading on the network. A problem may occur if a large volume of data from other applications overloads the network temporarily. Under such circumstances even the prioritization of VoIP packets does not guarantee timely delivery of all packets for all the VoIP calls in progress at the time.

Many VoIP devices designed to intercommunicate with the PSTN compress the G.711 audio stream to minimize the amount of data sent over the IP packet network. This can reduce the delay and jitter experienced by the recipient and reduce the likelihood of packet being lost or discarded somewhere in the network. There are a large number of voice compression standards in use, for example G.723, G.726, G.728, G.729 are compression algorithms that are commonly used in standard cell phones or VoIP systems that may intercommunicate with the PSTN. Other, more recent "High Definition Voice" or wideband speech codecs such as G.722.1 and G.722.2 offer improved speech quality, although they provide no advantage when coupled to the PSTN since they are optimized for a broader spectrum than the 300 Hz to 3000 Hz bandwidth limitation of the PSTN. Using voice compression techniques, the data rate is reduced from full rate to a fraction, and many commonly used VoIP algorithms compatible with the PSTN operate at an eighth rate or less. G.729 Annex B, for example, operates at 8 Kbps and is often used over the PSTN and considered to be very close to toll quality when used under ideal network conditions. By comparison, wideband codecs such as encompassed by G.722, typically operate at data rates from 24 Kbps to 64 Kbps, and cover a speech bandwidth of 50 Hz to 7000 Hz.

However, in conventional VoIP systems the bandwidth saved using voice compression is often offset by the addition of TCP/IP packet overhead and the requirements of call session management. For example, a typical VoIP call using G.729 compression still creates a 30 Kbps IP data stream. Since only 8 Kbps is the compressed voice payload, the bulk (approximately 22 Kbps) is network routing and management overhead.

Furthermore, since all voice compression algorithms function by discarding information during the compression process the inevitable result is that the audio signal output at the receiving end of the link is to some extent a distortion of the input audio signal. Most advanced PSTN compatible voice compression algorithms are structured to retain those qualities that optimize voice recognition by the human ear and not to retain the exact frequency and phase qualities of the incoming signal. Consequently, even though the audio may sound close to perfect to the human ear, the decoders of analog modems and fax machines that rely on exact frequency and phase information cannot normally decode signals that have been transmitted over VoIP systems using compression. Even for voice calls, additional complexities arise when there is high background noise, a combination of speech and music, or multi-party conferencing.

As a result, the use of compression on conventional VoIP calls is largely restricted to circumstances where bandwidth is at a premium and a slight but noticeable degradation in call quality is an acceptable trade-off with respect to the accrued cost savings. Satellite links are a prime example of where bandwidth is expensive and always at a premium. Standard 3G cellular telephone calls use digital compression in order to maximize call capacity of cell phone networks.

Using conventional solutions, the difficulty in ensuring timely delivery of a high volume of VoIP packets over high capacity (broadband) digital Wide Area Networks is an ongoing problem. Generic prioritization techniques such as offered by MPLS (Multi-Protocol Labelling System) are not adequate under these circumstances and the limitations of this approach are evidenced by the detrimental effect on VoIP voice quality often noticed in practice, even in some of the most advanced networks to date.

The latest generation of WAN devices decouple the networking hardware from its control mechanism, to create dynamic networks known as Software Defined WANs (SD-WANs). The key benefit of SDWANs is that they provide the framework to add a new level of control over data traffic management and flow based on application-level policies. This in turn allows higher performance hybrid networks to be built when coupling commercially available Internet services to more expensive private networks. While SDWANs have successfully addressed the management and optimization of high volume data applications, so far SDWANs have generally ignored VoIP traffic, including High Definition Voice, other than to continue the practice of prioritizing the delivery of individual packets across the network. However, problems with voice quality still occur when there are a large number of simultaneous calls in progress between nodes.

Conventional solutions have at most recognized that within a SDWAN environment the use of voice compression may be helpful when bandwidth is at a premium, such as over relatively low bandwidth wireless or other low bandwidth terrestrial or satellite connections. However conventional systems have failed to recognize, what Applicants disclosed solution described below addresses and overcomes. Over some high capacity SDWAN broadband links, the use of compression does not fully address the problem of maintaining voice quality since it does not ease the congestion created by the high volume of packets generated by a large number of concurrent IP based telephone calls. High Definition Voice packet streams are subject to the same problems of delay, jitter and delivery as conventional VoIP packet streams. The successful convergence of voice and data on next generation LTE and SDWAN networks is dependent upon more than just the use or improvement in the audio compression algorithms. To ensure the highest audio quality and stability for both High Definition Voice and PSTN compatible audio, what is needed in order to overcome the shortcomings of conventional solutions is a combination of other techniques that minimize the negative impact of high packet volume within SDWAN networks.

SUMMARY OF THE DISCLOSURE

The present disclosure sets forth various exemplary embodiments of apparatus, systems, methods and computer program products for the transmission of audio communications over a packet based data network.

Embodiments are directed to LTE packet based data networks, wired packet based data networks, terrestrial networks, satellite networks, optical data networks and/or wireless packet based data networks. Embodiments are also directed to software defined wide area network (SDWAN) networks.

According to an exemplary embodiment, a system, computer implemented method, and/or nontransitory computer accessible media, may be for transmitting and receiving public switched telephone network (PSTN) compatible audio frequency signals or High Definition Voice signals over a packet data network wherein the packet data network comprises a software defined wide area network (SDWAN), the system, method and/or nontransitory computer accessible media can include: a first system configured to: receive one or more first incoming PSTN-compatible or High Definition Voice audio frequency signals; digitize said one or more first incoming PSTN-compatible or High Definition Voice audio frequency signals according to an audio standard to obtain first digitized PSTN-compatible or High Definition Voice audio frequency signals; segment said first digitized PSTN-compatible or High Definition Voice audio frequency signals to generate one or more first sequences of audio signal samples, each of said one or more first sequences of audio signal samples comprising a first preprogrammed sample size; compress said each of said one or more first sequences of audio signal samples according to a first preprogrammed set of rules comprising a first preprogrammed compression algorithm, to produce a first sequence of one or more strings of processed samples, if said each of said one or more first sequences of audio signal samples is determined to meet a first preprogrammed criteria for compression according to said first preprogrammed set of rules; accumulate said first sequence of said one or more strings of processed samples to create a first group of samples ready for transmission according to a first aggregation threshold defined by a second preprogrammed set of rules, create a first outgoing digital message from said first group of samples ready for transmission according to a forwarding threshold defined by a third preprogrammed set of rules, using at least one of: a first pre-defined data link protocol, or a first control channel; transmit said first outgoing digital message over the software defined wide area network (SDWAN) to a second system; receive, from the SDWAN, and interpret, a first incoming digital message from the second system; process said first incoming digital message into one or more incoming digital audio stream samples according to said third pre-programmed set of rules comprising said first pre-defined data link protocol, or said first control channel, or a second pre-defined data link protocol, or a second control channel; and accumulate and process said one or more incoming digital audio stream samples according to a fourth preprogrammed set of rules comprising being configured to: decompress any compressed of said one or more incoming digital audio stream samples according to a first preprogrammed decompression algorithm defined by said fourth preprogrammed set of rules into decompressed digital audio samples; accumulate said first decompressed digital samples into a first buffer according to a first jitter buffer threshold, wherein said first jitter buffer threshold is defined by said fourth preprogrammed set of rules; and regenerate first outgoing PSTN-compatible or High Definition Voice audio frequency signals based on said first decompressed digital audio samples.

According to exemplary embodiments, the system, method or nontransitory media may include wherein said first system is configured to create comprises using said first control channel, and further comprising wherein said first system is configured to: establish said first control channel between said first system, and said second system, in advance of processing said one or more first incoming PSTN-compatible or High Definition Voice audio frequency signals, comprising wherein said first system is configured to: set up at least one voice trunk as soon as said first system and said second system are switched on, wherein said first control channel is ready when a first call is made, providing for faster call connect, and greater efficiency than absent said establishing.

According to exemplary embodiments, the system, method or nontransitory media may include wherein said first system configured to create comprises using said first control channel, and further comprising wherein said first system is configured to: wait for receipt of a first call, and upon said receipt of said first call, establish said first control channel between said first system, and said second system, based on real time call requirements of said first call, to allow processing said one or more first incoming PSTN-compatible or High Definition Voice audio frequency signals; and wherein said first system is configured to comprise: wherein said first control channel comprises, depending on preprogrammed criteria, to either one of: become permanently established; or become temporarily established.

According to exemplary embodiments, the system, method or nontransitory media may include wherein said first system and said second system are configured to: connect or couple said first system and said second system simultaneously to one another, creating a mesh network.

According to exemplary embodiments, the system, method or nontransitory media may include wherein the packet data network comprises any one or more of: a wired network; a wireless network; an optical fiber network, a satellite network, a cable network, a DSL network, a ISDN network, a leased line network, a 4G wireless network; a 5G wireless network; a 6G wireless network; an n-G wireless network; a Long-Term Evolution (LTE) network; a wireless LTE network; a GSM/EDGE network; a UMTS/HSPA network; a CDMA2000 network; a 4G LTE network; a 3G or 3GPP network; a WiMAX network; an evolved high speed packet access network; an LTE Advanced network; a WiMAX-Advanced network; a True 4G network; an IMT-Advanced network; an LTE Time-Division Duplex (LTE-TDD) network; an LTE Frequency-Division Duplex (LTE-FDD) network; a Voice over LTE (VoLTE) network; a Circuit-switched fallback (CSFB) network; a Simultaneous voice and LTE (SVLTE) network; or a Single Radio Voice Call Continuity (SRVCC) network.

An exemplary embodiment sets forth an automated system that may include a first system that may analyze the incoming signal originating from a first analog communications device operable to process the incoming signal and may transmit a digital message over a SDWAN according to rules defined for the first system, and may further include a second system that may receive said message from the SDWAN operable to generate an analog compatible signal and transmit said signal to a second analog communications device, where such analog signal may be generated according to the received data and rules defined for the second system.

In an exemplary embodiment, said second system may also receive an incoming signal originating from said second analog communications device operable to process the incoming signal and may transmit a digital message over a SDWAN according to rules defined for the second system, and said first system may receive information from the SDWAN operable to generate an analog compatible signal and transmit said signal to said first communications device, where such analog signal maybe generated according to the received data and rules defined for the first system.

In an exemplary embodiment, said analog communications device(s) may connect to said first and second systems through an optional switching system such as, e.g., but not limited to, a Private Branch Exchange (PBX) system, a Key system, or a carrier class switch which may digitize or regenerate said analog signal(s) according to industry standards.

In an exemplary embodiment, said SDWAN may be any optical or wired or satellite or wireless data network, such as, e.g., but not limited to, an internet protocol (IP) network that may operate over an optical or wired or satellite or wireless link and may have varying delay depending on the network performance at any particular time.

In an exemplary embodiment, said rules for the system includes a mechanism whereby analog information may be digitized; digital information may be accumulated prior to transmission; compressed according to a pre-specified compression rules; and transmitted over a SDWAN using a data link protocol, said data link protocol being optimized for the transmission of analog communications over a SDWAN packet data link according to one or more of; the content of the audio stream; network characteristics; preprogrammed rules; and operational parameters programmed into the exemplary system.

In another exemplary embodiment, the said first or second analog communications devices or both may connect to a packet data network using, e.g., but not limited to, a VoIP connection such that analog signal may be received by the first and second systems directly from a packet data network as uncompressed or compressed voice (VoIP) data or from a PSTN connection after passing through a VoIP to PSTN gateway device.

In another exemplary embodiment, the said first or second analog communications devices or both may connect to a packet data network using, e.g., but not limited to, a VoIP connection such that analog signal may be received by the first and second systems directly from a packet data network as uncompressed or compressed voice (VoIP) data from a High Definition Voice connection or from a PSTN connection after passing through a High Definition Voice to PSTN gateway device.

In another exemplary embodiment, the said first or second analog communications devices or both may connect to a packet data network using, e.g., but not limited to, a VoIP connection such that analog signal may be received by the first and second systems directly from a packet data network as uncompressed or compressed voice (VoIP) data from a High Definition Voice connection or from a conventional PSTN compatible VoIP connection after passing through a High Definition Voice to conventional VoIP gateway device.

An exemplary embodiment sets forth an automated system, method, and/or computer program product for transmitting and receiving PSTN or High Definition Voice compatible analog or digital audio frequency signals over a SDWAN, which may include, in an exemplary embodiment, a first system operative to: receive incoming PSTN or High Definition Voice compatible audio frequency signals; analyze and process said incoming audio signals; digitize incoming analog audio signals; accumulate said digital or digitized audio signals; compress said accumulated digital or digitized audio signals using preprogrammed rules; transmit a digital message containing said compressed audio signals to a second system using preprogrammed rules and a data link protocol optimized for the transmission of analog communications over a SDWAN; a second system operable to receive and interpret incoming digital messages from the first system; and decode and regenerate outgoing audio frequency PSTN or High Definition Voice compatible signals using preprogrammed rules for the second system.

In the system according to an exemplary embodiment, may include where said analog communications device(s) connect to said first and second systems through an optional switching system such as, e.g., but not limited to, a Softswitch, a Private Branch Exchange (PBX) system, a Key system, or a carrier class switch which may digitize or regenerate said analog signal(s) according to industry standards.

The system according to an exemplary embodiment may include where the SDWAN comprises an Internet Protocol (IP) based network.

The system according to an exemplary embodiment may include where the SDWAN comprises in part a satellite network.

The system according to an exemplary embodiment may include where the SDWAN data comprises at least one of a cable, an optical fiber or any other type of terrestrial based network.

The system according to an exemplary embodiment may include where said first system and said second system are located at least one of: at a single location, or at different locations.

The system according to an exemplary embodiment may include where provided an ability to interface to a VoIP packet system.

The system according to an exemplary embodiment may include where provided an ability to interface to a High Definition Voice packet system.

The system according to an exemplary embodiment may further include where at least one of: audio compression, or audio decompression, by at least one of: PSTN, or VoIP, or High Definition Voice systems.

The system according to an exemplary embodiment may include where the system uses at least one of: predetermined information, learned information, or preconfigured information, to determine said preprogrammed rules to apply to the compression and to the transmission of PSTN-compatible or High Definition Voice audio signals between said first and second systems.

The system according to an exemplary embodiment may further include where a control channel comprising at least one of: an in-band control channel, or an out-of-band control channel, said control channel operable to remotely manage said first and second systems, and wherein said control channel is operable to provide communications to perform at least one of: provide monitoring function; provide a control function; determine real time diagnostic information; determine status information; or determine ancillary information.

The system according to an exemplary embodiment may include where the first system is operative to process at least one of: compress digitized audio prior to transmission according to pre-programmed compression rules; transmit over a SDWAN using a data link protocol optimized for the transmission of analog communications over a SDWAN using pre-programmed rules.

An exemplary embodiment sets forth an automated system, method, and/or computer program product for transmitting and receiving public switched telephone network (PSTN) compatible or High Definition Voice analog or digital audio signals over a SDWAN, where the method may include: receiving first incoming PSTN-compatible or High Definition Voice audio frequency signals; analyzing and processing said incoming signals; digitizing incoming analog audio signals; accumulating said digital or digitized audio signals; compressing said digital or digitized incoming audio signals using preprogrammed rules; transmitting a message containing said compressed audio signals to a second system using preprogrammed rules using a data link protocol optimized for the transmission of analog communications over a SDWAN; receiving and interpreting a second incoming digital messages from the first system; and decoding and regenerating outgoing audio frequency PSTN or High Definition Voice compatible signals using preprogrammed rules for the second system.

The method according to an exemplary embodiment, may include where said analog communications device(s) connect to said first and second systems through an optional switching system such as, e.g., but not limited to, a Softswitch, a Private Branch Exchange (PBX) system, a Key system, or a carrier class switch which may digitize or regenerate said analog signal(s) according to industry standards.

The method according to an exemplary embodiment may include where the SDWAN comprises an Internet Protocol (IP) based network.

The method according to an exemplary embodiment may include where the SDWAN comprises in part a satellite network.

The method according to an exemplary embodiment may include where the SDWAN comprises at least one of a cable, an optical fiber or any other type of terrestrial based network.

The method according to an exemplary embodiment may include where said first system and said second system are located at least one of: at a single location, or at different locations.

The method according to an exemplary embodiment may further include where providing the ability to interface to a VoIP packet system.

The method according to an exemplary embodiment may further include where providing the ability to interface to a High Definition Voice system.

The method according to an exemplary embodiment may further include where compressing or decompressing, at least one of: PSTN compatible, or High Definition Voice compatible, or VoIP compatible audio signals.

The method according to an exemplary embodiment may include where using at least one of: predetermined information, learned information, or preconfigured information, in determining said preprogrammed rules to apply to the compression and to the transmission of PSTN-compatible or VoIP compatible or High Definition Voice compatible audio signals between said first and second systems.

The method according to an exemplary embodiment may further include where using a control channel comprising at least one of: an in-band control channel, or an out-of-band control channel, said control channel operable to remotely manage said first and second systems, and wherein said control channel comprises providing communications performing at least one of: providing monitoring function; providing a control function; determining real time diagnostic information; determining status information; or determining ancillary information.

The method according to an exemplary embodiment may include where the first system comprises providing at least one of: compressing digitized audio prior to transmission according to pre-programmed compression rules; transmitting over a SDWAN using a data link protocol optimized for the transmission of analog communications over a SDWAN using pre-programmed rules.

An exemplary embodiment sets forth an automated system, method, and/or computer program product, where the machine-readable medium that provides instructions, which when executed by a computing platform, causes said computing platform to perform operations, which may include: a method for receiving first incoming VoIP, High Definition Voice or PSTN-compatible analog or digital audio frequency signals; analyzing and processing said incoming signals; digitizing incoming analog audio signals; accumulating said digital or digitized audio signals; compressing said digital or digitized incoming audio signals using preprogrammed rules; transmitting a message containing said compressed audio signals to a second system using preprogrammed rules using a data link protocol optimized for the transmission of analog communications over a SDWAN; receiving and interpreting a second incoming digital message from the first system; and decoding and regenerating outgoing audio frequency VoIP, or High Definition Voice, or PSTN compatible signals using preprogrammed rules.

The computer program product according to an exemplary embodiment where the method may include where the method comprises: performing functions of said first system and said second system at least one of: at a single location, or at different locations.

The foregoing embodiments, together with embodiments directed to methods and products thereof, are described in greater detail below.

BRIEF DESCRIPTION OF THE DRAWINGS

Various exemplary features and advantages of the invention will be apparent from the following, more particular description of exemplary embodiments of the present invention, as illustrated in the accompanying drawings wherein like reference numbers generally indicate identical, functionally similar, and/or structurally similar elements. The left most digits in the corresponding reference number indicate the drawing in which an element first appears.

FIG. 11 depicts an exemplary flow diagram, according to an exemplary embodiment of yet another exemplary first system, in accordance with an exemplary embodiment

DETAILED DESCRIPTION OF VARIOUS EXEMPLARY EMBODIMENTS OF THE DISCLOSURE

Figure 1:
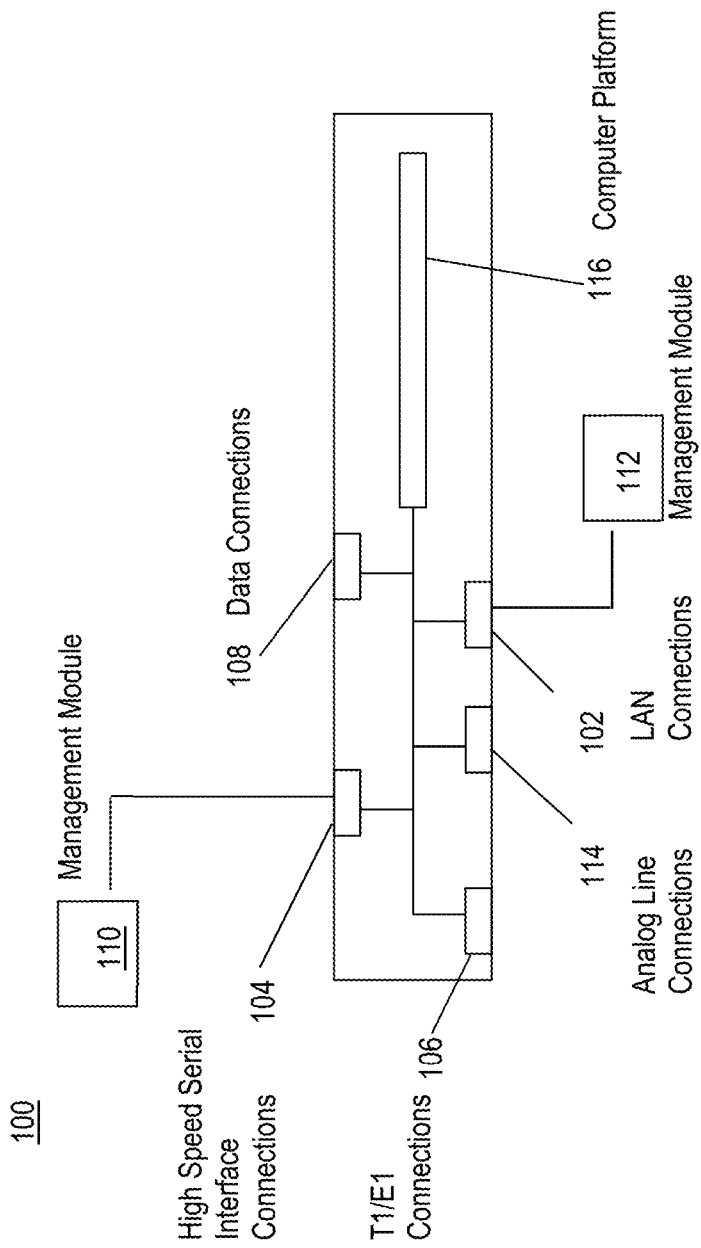
FIG. 1 illustrates an exemplary device in accordance with the present exemplary embodiments.

Various preferred exemplary embodiments of the disclosure including any preferred embodiments are discussed in detail below. While specific exemplary embodiments are discussed it should be understood that this is for illustrative purposes only and not be in way of limitation. A person skilled in the relevant art will recognize that other configurations, modifications, implementations and/or substantially similar alternative embodiments may be used without parting from the spirit and scope of the invention.

Introduction

Analog Public Switched Telephone Network (PSTN) lines are being phased out and replaced by IP packet data networks for many reasons. IP packet data networks are widely accessible using terrestrial fiber, cable, wireless and satellite connections. They provide a common architecture for the convergence of all types of communication with immediate, enhanced capability and are generally more cost effective to maintain than dial up telephone lines.

Whereas voice and modem computer communications benefit from being moved from analog lines to broadband IP packet networks, the large scale move of voice communications from dial-up services provided by analog land lines and cellphones to public IP packet data networks can be more problematic. A number of inter-related factors affect the ability of IP networks to support dependable toll quality VoIP or High Definition Voice communications. These include bandwidth limitations on lower speed links, network delay and jitter, all of which can affect the perceived quality of the audio. This is particularly relevant to wireless connections but also applies to any network connection if it is a potential communications bottleneck that may become overloaded and cause packet delays, packet discards and other errors which disrupt the real time flow of audio packets. Of course the overall stability of wireless links generally with respect to outside interference, weather and atmospheric variations in signal strength is an added complication exposing them to greater potential disruption than other communications media. Even so, wireless data services have emerged as a popular alternative to the PSTN for last mile connectivity due to their low cost and ease of deployment, even though the quality and dependability of VoIP communications may be compromised when compared to higher speed terrestrial circuits.

The introduction of SDWAN technology offers the promise of a new level of performance upon which higher quality, converged service platforms will be based. While the network demands of voice communications may be considered minimal when there is a low call volume, the number of packets generated between nodes rapidly increases as the number of simultaneous calls rises. Even over SDWANs the prioritization of conventional VoIP and High Definition Voice packets cannot prevent some packets from being blocked momentarily due to the high number of them (i.e. often several thousands of packets per second) being generated and squeezed between the large data packets of other applications. Eventually it reaches a point where the inevitable problems of network delay, jitter and stability start to impact call quality, even though the conventional VoIP and High Definition Voice packet streams may have the highest priority on the network. Under these circumstances the volume of voice packets can overload the switching and throughput capacities of the SDWAN, even though the total bandwidth being used by VoIP calls may be minimal compared to the overall theoretical capacity of the WAN hardware. The problem is magnified of course when there is a significant bottleneck such as a wireless access point.

However, even within the core of a large terrestrial IP network the accumulation of tiny voice packets can create bottlenecks that are typically not addressed by SDWAN devices. Most SDWAN devices treat each packet generated by each VoIP call independently and each packet stream independently as well, even though there may be multiple active calls between any two nodes. The present invention addresses the problem of maintaining high quality audio over a SDWAN under these circumstances. The invention combines PSTN compatible VoIP and High Definition Voice packets into one or more optimized packet streams between SDWAN controlled devices.

Overview of Exemplary Embodiments

The exemplary embodiments may provide an apparatus, a method and/or computer program product for the transmission of audio communications over a SDWAN packet based data network. In the exemplary embodiments, the system utilizing audio communications may comprise a standard analog communications device that may normally connect or couple to a second analog communications device through a PSTN connection. The analog communications device may be, e.g., but not be limited to, a cellphone, a telephone handset, a PBX system, a fax machine or an analog dial modem using audio tones for communications. In the exemplary embodiments the SDWAN may be, e.g., but not be limited to, an LTE Internet Protocol (IP) network.

For example, a cellular wireless IP data connection or other wired IP network may be used to provide all or part of the primary, or all or part of a backup connection between coupled analog communications devices.

Exemplary Embodiments

The present exemplary embodiments can be performed by, e.g., but not limited to, one or more products available from NSGDATACOM, INC. of Chantilly, Va. USA and/or another, or an adaptation thereof in accordance with the present exemplary embodiments. Such exemplary products may include, e.g., but not limited to, devices 100 access router Wi-Modem™, access router V-Turbo™ and Network exchange Nx2222™ among others.

An exemplary device 100, may include, in an exemplary embodiment, a public switched telephone network (PSTN) and/or other data interfaces designed to connect and/or couple analog voice, facsimile, dial modem and/or data to e.g., but not limited to terrestrial, wireless, and/or satellite IP networks. The exemplary device 100 may have multiple exemplary interfaces of each of various types and function as a telecommunications switching platform for, e.g., but not limited to aggregating, optimizing and/or routing simultaneous calls over at least single IP network connection.

Referring to FIG. 1, device 100 may provide hardware, software, or a combination thereof to provide an integrated and/or scalable exemplary design. As shown, the exemplary device may include, e.g., but not limited to, multiple 10/100/1000/10G/25G/100G/200G Ethernet LAN connections 102, one or more high speed serial interfaces 104, one or more Analog PSTN connections 106, and/or one or more data connections 108.

Exemplary LAN connections 102 may include, for example, but not limited to multiple integrated switched Ethernet interfaces, auto sensing enabled 10BaseT, 100BaseT,1000BaseT, 2.5GBase-T, 5GBase-T, 10GBase-T, or 10Base, 25Base, 50Base, 100Base, 1000Base, 10GBase, 25GBase, 40GBase, 100Base, or 200GBase, wired or optical fiber interface user or hub connectivity, etc.

Exemplary high speed serial interfaces 104 may include, for example, but not limited to, RJ 45 interfaces, internal or external clocking, software configurable DTE/DCE, V.24/RS-232/V.35/RS-449,/X.21, and/or high speeds from, for example, but not limited to, 1200 bps to 10 Mbps etc. Exemplary connections may include, for example, but not limited to, X.25, Frame Relay NNI, UNI, FRF4/ITU, Q.933, Frame Relay Annex D, LMI, including PVC and/or SVC support, etc.

Exemplary T1/E1 connections 106 may provide, e.g., but not limited to, digital voice, fax, dial modem and/or data, up to multiple channels of voice compression, drop and insert for DS0/timeslots between interfaces, support for CAS and ISDN, transparent pass through for signaling via SS7, and/or transparent TDM clock recovery over IP, etc. Exemplary voice, and/or facsimile connections may include, for example, support for CAS/ISDN/E&M, H.323, SIP, B2BUA, G.711, G723, G.729a, CELP 4.8/7.4 kbps, Algebraic code-excited linear prediction £ACELP 5.5/8.0 kbps, V.27ter, V.29 and/or Group III. Exemplary dial modem protocols may include, e.g., but not limited to, FSK, PSK, DTMF,_QAM or Pulse modulation, V14, V17, Bell 101, Bell 103, V21, V.22, V.22bis, Bell 212A, V.23, Bell 202, V.26, V.26bis, V.27ter, V.29, V.32, V.32bis, V.34, V.42, V.42bis, V.44, V.90, and/or V.92, etc.

Exemplary data connections 108 may include internal and/or external clocking, software configurable DTE/DCE, V.24/RS-232/V.35/RS-449,/X.21, and/or speeds from, for example, but not limited to, 1200 bps to 2.048 Mbps, etc. Exemplary connections may include, for example, but not limited to, Asynchronous or Synchronous data, X.25, Frame Relay NNI, UNI, FRF4/ITU, Q.933, Frame Relay Annex D, LMI, including PVC and/or SVC support, etc.

Exemplary Analog line connections 114 may include, for example RJ 45 or RJ11 interfaces, FXS, FXO, E&M software configurable voice, fax, dial modem and/or data. Exemplary voice, and/or facsimile connections may include, for example, support for CAS/ISDN/E&M, H.323, SIP, B2BUA, G.711, G.729a, CELP 4.8/7.4 kbps, Algebraic code-excited linear prediction £ACELP 5.5/8.0 kbps, V.27ter, V.29 and/or Group III. Exemplary dial modem protocols may include FSK, PSK, DTMF, QAM or Pulse modulation, Ademco Contact ID Protocol, V14, V17, Bell 101, Bell 103, V21, V.22, V.22bis, Bell 212A, V.23, Bell 202, V.26, V.26bis, V.27ter, V.29, V.32, V.32bis, V.34, V.42, V.42bis, V.44, V.90, and/or V.92.

A management module 110 may interface with device 100, through for example, high speed serial interface connections 104. Management module 110 may include, for example, a Graphical User Interface (GUI) hosted, for example, by a Microsoft Windows® PC, etc. Configuring, monitoring and troubleshooting over public, private or hybrid networks may be provided. Distributed management of existing equipment via Simple Network Management Protocol (SNMP) may also be provided.

Management may also be provided remotely. For example, a management module 112 may provide remote management support over exemplary T1/E1 connections 106 and/or 108 or over exemplary LAN connection 102. In an exemplary embodiment, device 100 is remotely configurable through a Telnet session through a remotely attached exemplary MICROSOFT WINDOWS® PC, etc. In another exemplary embodiment, device 100 is remotely configurable by a SDWAN controller.

In one or more embodiments device 100 may include an internal or remotely accessible computer platform 116 that can perform any and all functions associated with internal processing and the foregoing network connections and associated protocols. The computer platform 116 can receive and execute software applications and display data transmitted from a management module or another computer device. The computer platform 116 may include an application-specific integrated circuit ("ASIC"), or other chipset, processor, microprocessor, logic circuit, Digital Signal Processor ("DSP"), or other data processing device. The ASIC or other processor may execute an application programming interface ("API") that interfaces with any resident programs, in a memory of the device 100. The API may be a runtime environment executing on the device 100, to operate to control the execution of applications on the device. The memory may include read-only and/or random-access memory (RAM and ROM), EPROM, EEPROM, flash cards, or any memory common to the computer platform 116. The computer platform 116 may also include a local database that can hold the software applications, or data not actively used in memory. The local database may include flash memory cells, or secondary storage, such as optical or magnetic media, tape, or soft or hard disk. In addition, computer platform 116 may be replaced by and/or may function in addition to any or all of the components of computer system 400 shown in FIG. 4.

In an exemplary embodiment, computer platform 116 may provide device 100 the capability to decode PSTN analog tones using standard DSP techniques and/or standard modem protocols. The computer platform 116 may also provide the capability to compress and uncompress voice traffic according to standard VoIP or High Definition Voice algorithms. Device 100 may support a mixture of both analog and/or digital PSTN voice connections with compression to a maximum of a predefined number of analog voice ports and/or digital (T1/E1) trunks per unit, with an overall maximum of voice, facsimile and/or data (DS0) circuits per unit. Analog voice ports may be configured for connection to a local PBX or to telephone handsets, facsimile or dial modems. The computer platform 116 may provide device 100 queue buffer, jitter buffer and/or echo cancellation mechanisms deployed to maintain quality over circuits with long and/or varying delays such as, e.g., but not limited to wireless, multiple, and/or satellite hops.

In an exemplary embodiment, computer platform 116 may provide, device 100 PSTN IP Gateway with Packet Switching capability via exemplary gateway and/or switching algorithms, etc. As interoperability is provided, device 100 may conform to, e.g., but not limited to, H.323 v2 and SIP (including B2BUA), enabling integration with soft switches and/or PC-based telephony. Device 100 may provide comprehensive gateway functions that may allow interfacing between different network services and types. For example, device 100 may interface to Voice over IP ("VoIP") networks and/or to High Definition Voice systems, may compress voice traffic over terrestrial, satellite or wireless connections, may simultaneously reduce the bandwidth used by a factor, and/or reduce the number of IP packets transmitted by a factor.

In an exemplary embodiment, computer platform 116 may provide device 100 with algorithms to, e.g., but not limited to receive incoming High Definition Voice and PSTN-compatible audio frequency signals; digitize said incoming audio signals; accumulate said digitized audio signals; compress said accumulated digitized audio signals using preprogrammed rules; transmit said compressed audio signals according to preprogrammed rules using a data link protocol optimized for the transmission of analog communications over a SDWAN network. Said preprogrammed rules to be configured in the unit and/or learned by the unit or received by the unit from a SDWAN controller which may be internal or external to the unit. These embodiments, described in greater detail below, may incorporate analog audio communications algorithms. In one or more such embodiments, analog based communications may be provided over exemplary SDWAN packet data network links.

In an exemplary embodiment, computer platform 116 may provide device 100 with the ability to provide secure communications between platforms, using, for example, the processes of digital encryption, digital authentication, and/or digital key exchange, among others.

Figure 2:
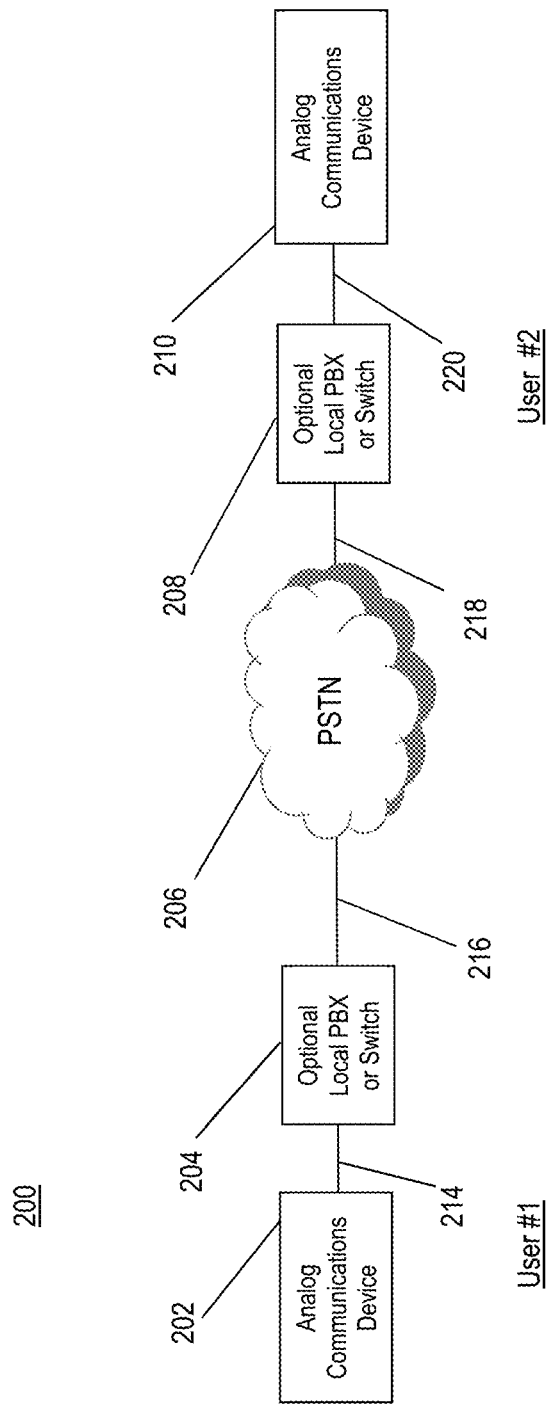
FIG. 2 illustrates an exemplary analog communications device, telephone, fax machine or dial modem connected to an optional local switch or PBX system which is connected to or coupled across the Public Switched Telephone Network (PSTN) with an exemplary, second optional switch or PBX system connected to a second analog communications device, telephone, fax machine or dial modem, e.g., dial telephones connected to or coupled to the PSTN in accordance with the present embodiments.

FIG. 2 illustrates an exemplary analog telephone system 200 with exemplary analog communications device 202 connected to or coupled with a second analog communications device 210 using the PSTN 206. As shown, analog communications device 202 is linked to the PSTN 206 via an optional PBX or switch 204, and analog communications device 210 is linked to the PSTN 206 via an optional PBX or switch 208.

In the illustrated exemplary embodiment, there may be one or more analog communications devices 202 and one or more connections 214, which may connect to or be coupled with one or more standard analog telephone lines 216 so that the optional local PBX or switch 204 may support multiple simultaneous calls.

In the illustrated exemplary embodiment, there may be one or more analog communications devices 210 and one or more connections 220, which may connect to or be coupled with one or more standard analog telephone lines 218 so that the optional local PBX or switch 208 may support multiple simultaneous calls.

In the illustrated exemplary embodiment, the analog communications devices 202 and 210 may connect to or coupled with the PSTN 206 using multiple individual serial connections couplings 214, 216, 218, 220 or using a shared digital connection such as T1/E1, which may also include an exemplary standards-compliant clock regeneration and/or jitter buffering to synchronize remote locations to an exemplary central network.

In the exemplary embodiments the analog communications devices 202, 210 may connect to or be coupled through the optional local PBX or switches 204, 208 to the PSTN 206 in real time using standard facsimile, dial modem or other tone based protocols. The direct connection provided by the PSTN 206 may provide uninterrupted communication during the period of the call that may allow the devices 202, 210 to synchronize and/or communicate continuously for the duration of the call. In other exemplary embodiments, alternative communications networks may provide real time, uninterrupted communication, such as e.g., but not limited to, some satellite and/or some circuit switched wireless networks as may be an operable alternative to the PSTN 206.

In another exemplary embodiment, a Very Small Aperture Terminal (VSAT) may provide a dedicated bandwidth link for the duration of an exemplary call and may allow analog communications devices to communicate successfully. VSAT terminals may include two-way satellite ground stations with an exemplary dish antenna typically smaller than 3 meters. VSATs may typically access satellites in geosynchronous orbit to relay data from small remote earth stations called terminals to other terminals in typically mesh configurations or master earth station hubs in star configurations. VSAT data rates may range from about narrowband up to approximately 4 Mbit/s. As used herein, the VSAT may share bandwidth in a time division mode. Demand assigned multiple access (DAMA) transmission may be used for an exemplary circuit-switched connection, wherein each user is permitted a slot of time on a demand (or request) basis.

In another exemplary embodiment, single channel per carrier/multiple channel per carrier (SCPC/MCPC) protocol transmission may be used. In exemplary embodiments, SCPC/MCPC may provide dedicated satellite link between a few distinct locations, where the links support either a single telephone line or several telephone or data lines. The links may, for example, be permanently assigned with no carrier switching or rerouting over the satellite.

In another embodiment, a circuit switched data connection or coupling over e.g., a cellular circuit switched wireless network may provide a dedicated bandwidth link for the duration of a call and may allow analog communications devices to communicate successfully.

Figure 3:
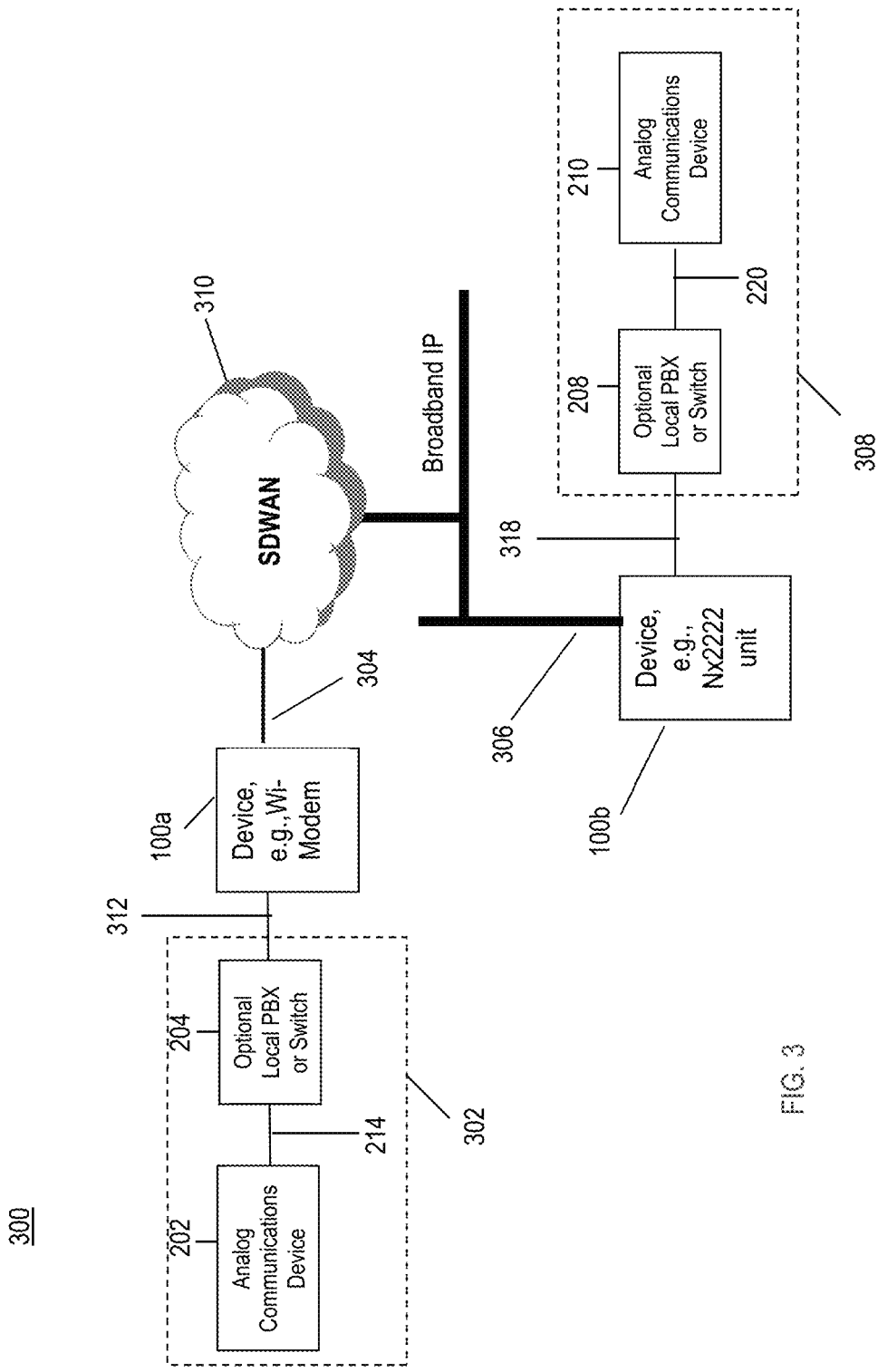
FIG. 3 illustrates an exemplary analog communications device connected to or coupled to a second exemplary analog communications device, using an exemplary SDWAN in accordance with various exemplary embodiments.

FIG. 3 illustrates an exemplary analog communication over a SDWAN data network 310 in accordance with the present exemplary embodiments. Environment 300 may include the foregoing analog telephone system 200 with an exemplary SDWAN IP data packet network replacing the PSTN 206. Environment 300 also illustrates an exemplary device 100a (left side) connected or coupled to an analog communications system 302, and another exemplary device 100b (right side) connected or coupled to analog communications system 308.

In an exemplary embodiment, a connection or coupling may exist between the exemplary devices 100a, 100b and the analog communications devices 202, 210, which may employ any known telecommunications link. In an exemplary embodiment, link 312 and link 318 may each be either a single analog line or a TDM based trunk type, such as T1 or E1, and each of 312 and 318 may be across any combination of telecommunications equipment.

In an exemplary embodiment, a network connection may exist between the exemplary devices 100, which may employ in part any known protocol over any known telecommunications network. In an exemplary embodiment, any of links 304, 306, for example, may provide IP based connections or couplings over, e.g., but not limited to, an exemplary data network 310 such as, e.g., a cellular wireless, satellite or terrestrial IP data network.

In exemplary embodiments, analog communication may be transmitted from the analog communications device 202 circuits of exemplary network 214, across link 312 to exemplary device 100a. Here, in exemplary device 100a the analog transmission may be digitized and accumulated, processed according to the current invention and transmitted over network links 304 and 306 to the second exemplary device 100b. Symbols received by the second exemplary device 100b may be converted into analog audio for transmission to the exemplary analog communications device 210 over networks 318 and 220 of telecommunications system 308. In exemplary embodiment 300, the link 318 between exemplary device 100b and the telecommunications system 308, may be a digital T1/E1 connection capable of supporting multiple simultaneous calls, or a single analog connection, which persons skilled in the art will recognize as being functionally equivalent for the current purpose.

In exemplary embodiments, analog communication may be transmitted from the analog communications device 210 of telecommunication system 308, across link 318 to exemplary device 100b. Here, in exemplary device 100b the analog signal may be digitized and accumulated, processed and transmitted over network links 306 and 304 to the exemplary device 100a connected or coupled to the telecommunication system 302. Symbols received by this exemplary device 100a may be converted into analog signals for transmission over link 312 to the exemplary analog communications device 202 of the telecommunication system 302.

As understood by skilled persons, networks 304 and 306 may also respectively represent portions of the same SDWAN network or any other known data network. For example, the devices may also be connected or coupled via an IP cable network, an X.25 or Frame Relay data packet network, or VSAT terminals (not shown) or other satellite communications enabling devices, etc. In exemplary embodiments, the respective VSAT uplink downlink may be connected over DAMA, SCPC, MCPC or other enabling protocols for transmission.

Figure 5:
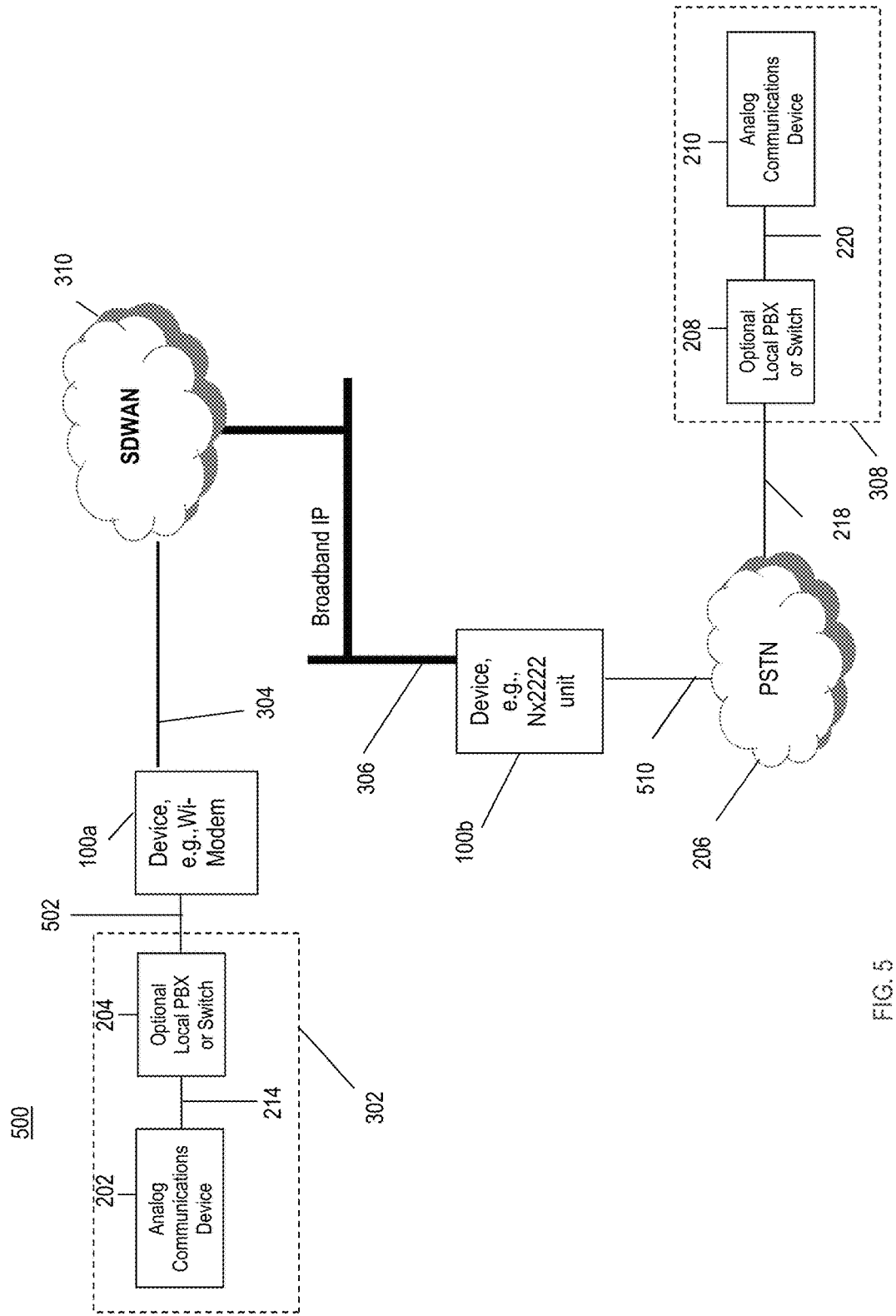
FIG. 5 illustrates an exemplary analog communications device connected to or coupled with an exemplary second analog communications device, the coupling of which may be through both a SDWAN and a PSTN switch in accordance with the various exemplary embodiments.

FIG. 5 illustrates an alternative exemplary embodiment 500 of analog communication over an SDWAN packet based data network connecting to or coupling with the PSTN in accordance with the present invention. Environment 500 includes the foregoing telecommunication system 308 connected to or coupled through the PTSN 206 to exemplary device 100b.

In an exemplary embodiment, a connection or coupling may exist between the exemplary devices, 100a and 100b and the analog communications devices 202 and 210, which may employ any known telecommunications link. In an exemplary embodiment, link 502 and link 510 may each be either a single analog line or a TDM based trunk type, such as T1 or E1, and each of 502 and 510 may be across any combination of telecommunications equipment.

Figure 6:
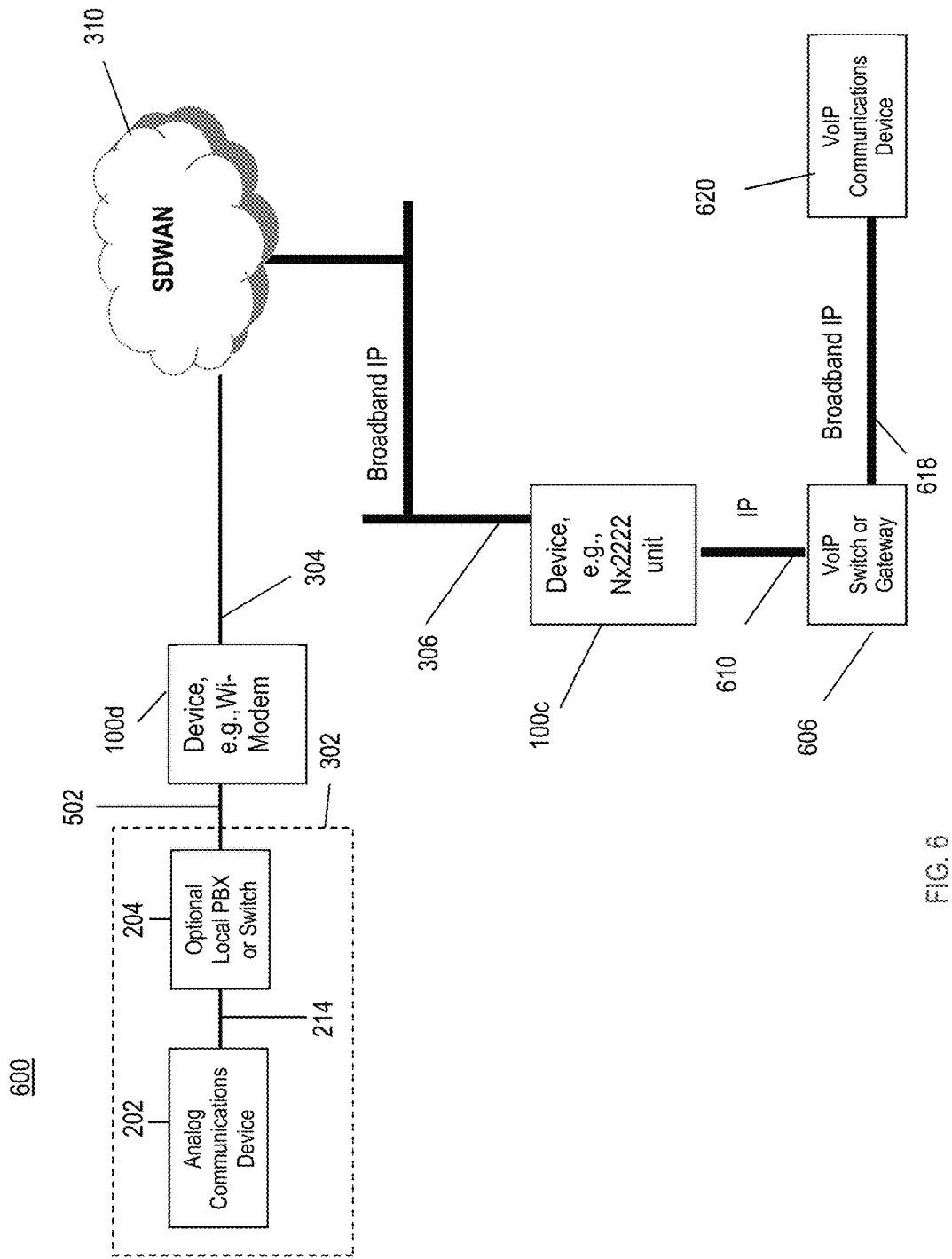
FIG. 6 illustrates an exemplary analog communications device connected to or coupled with an exemplary VoIP communications device, the coupling of which may be through both a SDWAN and a standards based Softswitch, or VOIP switch or VoIP gateway or High Definition Voice gateway in accordance with the various exemplary embodiments.

FIG. 6 illustrates an alternative exemplary embodiment 600 of analog communication over a SDWAN packet based data network connecting to or coupling with a VoIP or High Definition Voice communications device. Environment 600 includes the foregoing telecommunication system 302 connected to or coupled through exemplary devices 100d and 100c to a VoIP communications device 620 which may be connected to exemplary device 100c through a VoIP switch or gateway 606. The VoIP communications device 620 may be any standards-based conventional VoIP communications device or High Definition Voice communications device.

In an exemplary embodiment, a connection or coupling may exist between the exemplary device 100c and the VoIP or High Definition Voice communications device 620, which may employ any known telecommunications link. In an exemplary embodiment, link 610 may be either a single analog line or a TDM based trunk type, such as T1 or E1, or any type of IP connection. In an exemplary embodiment, links 618 610, and 502 may be across any combination of telecommunications equipment.

As understood by skilled persons, networks 306, 610 and 618 may also represent portions of the same IP data network or a SDWAN data network or any other known data network.

In an alternative exemplary embodiment, VoIP switch or gateway 606 which may be a High Definition Voice switch or gateway may be combined with exemplary device 100c such that connection 610 is internal to exemplary device 100c and VoIP communications device 620 connects to or is coupled directly with exemplary device 100c though link 618. A connection or coupling may exist between the exemplary device 100c and the VoIP communications device 620, which may employ any known telecommunications link. In an exemplary embodiment, link 618 may be across any combination of telecommunications equipment.

In an exemplary embodiment, a network connection or coupling may exist between the VoIP or High Definition Voice communications device 620 and exemplary device 100c, which may employ any known protocol over any known telecommunications network. In an exemplary embodiment, any of links 610, 618, for example, may provide IP based connections or a single analog line or a TDM based trunk type, such as T1 or E1. A gateway 606 may provide connection or coupling for converting VoIP which may include High Definition Voice, to a PSTN compatible communications signal.

In exemplary embodiments, analog communications signals may be transmitted from the telecommunications system of exemplary network 302, across link 502 to the exemplary device 100d. Here, in exemplary device 100d the analog communications signals may be digitized and converted to VoIP or High Definition Voice data packets and may be compressed using any known VoIP or High Definition Voice compression algorithm. The VoIP or High Definition Voice transmission may be accumulated and processed according to the current invention and transmitted over a SDWAN data network via links 304, and 306 to the exemplary device 100c. The symbols received by exemplary device 100c may be processed and converted to VoIP or High Definition Voice packets for transmission to the VoIP or High Definition Voice communications device 620 over links 610 and 618.

In exemplary embodiments, analog communications signals may be transmitted as VoIP or High Definition Voice packets from the VoIP communications device 620, across links 618 and 610 to exemplary device 100c. The VoIP packets may contain compressed audio compressed by the VoIP communications device 620 using any known VoIP or High Definition Voice compression algorithm. Here, in exemplary device 100c the VoIP or High Definition Voice packets may be received, accumulated, and processed according to the current invention, and transmitted over a SDWAN network to exemplary device 100d. In exemplary device 100d the received symbols may be processed according to the current invention, decompressed according to any known VoIP or High Definition Voice compression algorithm used by VoIP or High Definition Voice communications device 620 and transmitted to the telecommunications system of exemplary network 302, across link 502.

Figure 7:
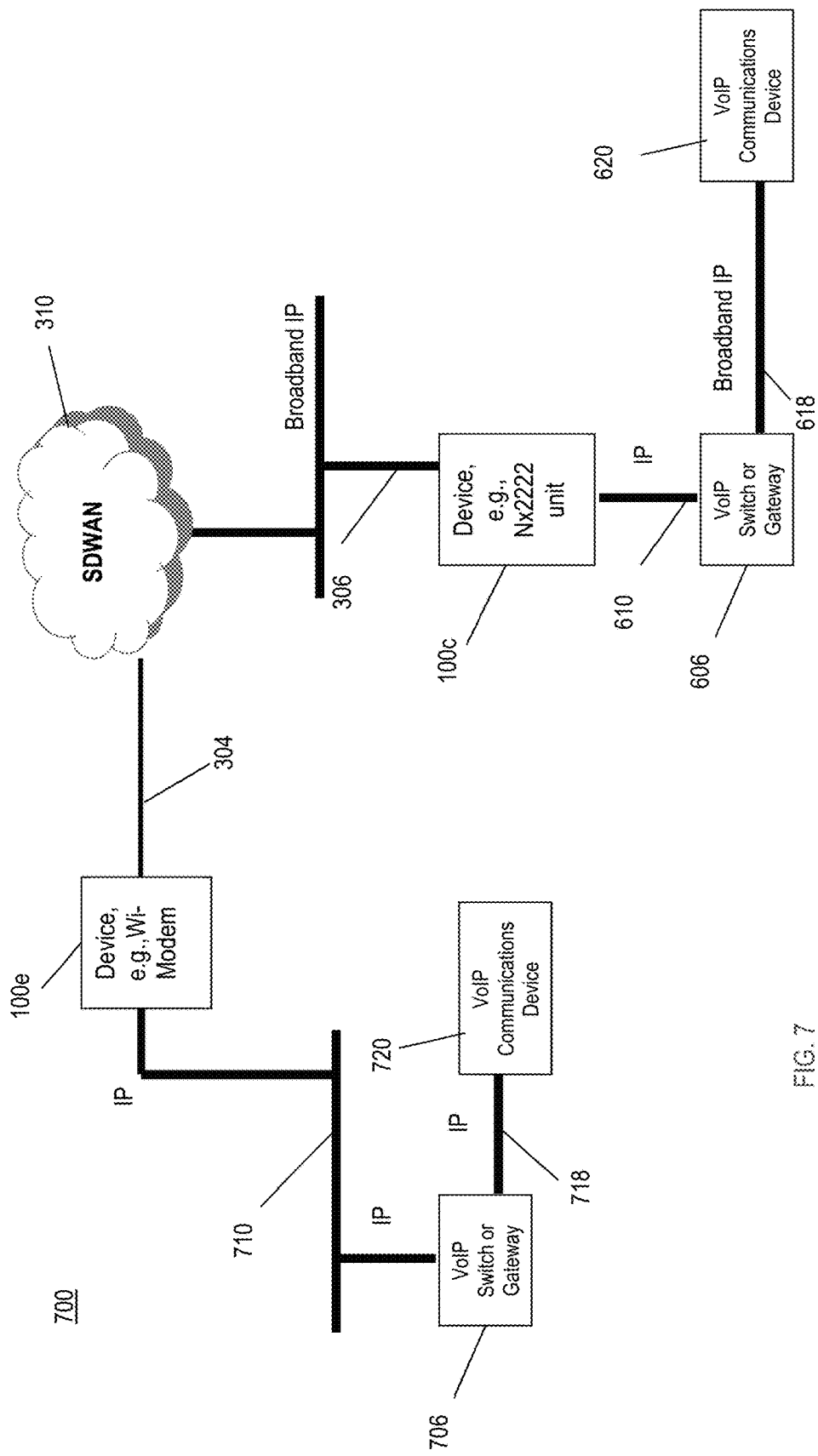
FIG. 7 illustrates an exemplary standards based or High Definition Voice or VoIP communications device connected to or coupled with an exemplary second standards based or High Definition Voice or VoIP communications device, the coupling of which may be through both a SDWAN and standards based or High Definition Voice or VOIP switches or standards based or High Definition Voice or VOIP gateways in accordance with the various exemplary embodiments.

FIG. 7 illustrates an alternative exemplary embodiment 700 of VoIP or High Definition Voice communications device 720 coupled to another VoIP or High Definition Voice communications devices 620 over a SDWAN data network through exemplary devices 100e and 100c which may be connected to exemplary devices 720 and 620 through VoIP or High Definition Voice switches or gateways 706 and 606 respectively.

In an exemplary embodiment, a connection or coupling may exist between the exemplary devices 100c and 100e and the VoIP or High Definition Voice communications devices 620 and 720, which may employ any known telecommunications links. In an exemplary embodiment, links 610 and 710 may be either a single analog line or a TDM based trunk type, such as T1 or E1, or any type of IP connection. In an exemplary embodiment, links 618 610, 710 and 718 may be across any combination of telecommunications equipment.

As understood by skilled persons, networks 710 and 718 may also represent portions of the same IP data network or a SDWAN data network or any other known data network.

In an alternative exemplary embodiment, VoIP or High Definition Voice switch or gateway 706 may be combined with exemplary device 100e such that connection 710 is internal to exemplary device 100e and VoIP or High Definition Voice communications device 720 connects to or is coupled directly with exemplary device 100e though link 718. A connection or coupling may exist between the exemplary device 100e and the VoIP or High Definition Voice communications device 720, which may employ any known telecommunications link. In an exemplary embodiment, link 718 may be across any combination of telecommunications equipment.

In an exemplary embodiment, a network connection or coupling may exist between the VoIP or High Definition Voice communications device 720 and exemplary device 100e, which may employ any known protocol over any known telecommunications network. In an exemplary embodiment, any of links 710, 718, for example, may provide IP based connections or a single analog line or a TDM based trunk type, such as T1 or E1. A gateway 706 may provide connection or coupling for converting VoIP or High Definition Voice to a PSTN compatible communications signal.

In exemplary embodiments, analog communications signals may be transmitted as VoIP packets from the VoIP or High Definition Voice communications device 720, across links 718 and 710 to exemplary device 100e. The VoIP or High Definition Voice packets may contain compressed audio compressed by the VoIP or High Definition Voice communications device 620 using any known VoIP or High Definition Voice compression algorithm. Here, in exemplary device 100e the VoIP data packets may be received, accumulated, and processed according to the current invention, and transmitted over a SDWAN data network to exemplary device 100c. In exemplary device 100c the received symbols may be processed according to the current invention and converted to VoIP or High Definition Voice packets for transmission to the VoIP or High Definition Voice communications device 620 over links 610 and 618.

In exemplary embodiments, analog communications signals may be transmitted as VoIP packets from the VoIP or High Definition Voice communications device 620, across links 618 and 610 to exemplary device 100c. The VoIP packets may contain compressed audio compressed by the VoIP or High Definition Voice communications device 620 using any known VoIP or High Definition Voice compression algorithm. Here, in exemplary device 100c the VoIP packets may be received, accumulated, and processed according to the current invention, and transmitted over a SDWAN data network to exemplary device 100e. In exemplary device 100e the received symbols may be processed according to the current invention and converted to VoIP packets for transmission to the VoIP or High Definition Voice communications device 720 over links 710 and 718.

Figure 8A:
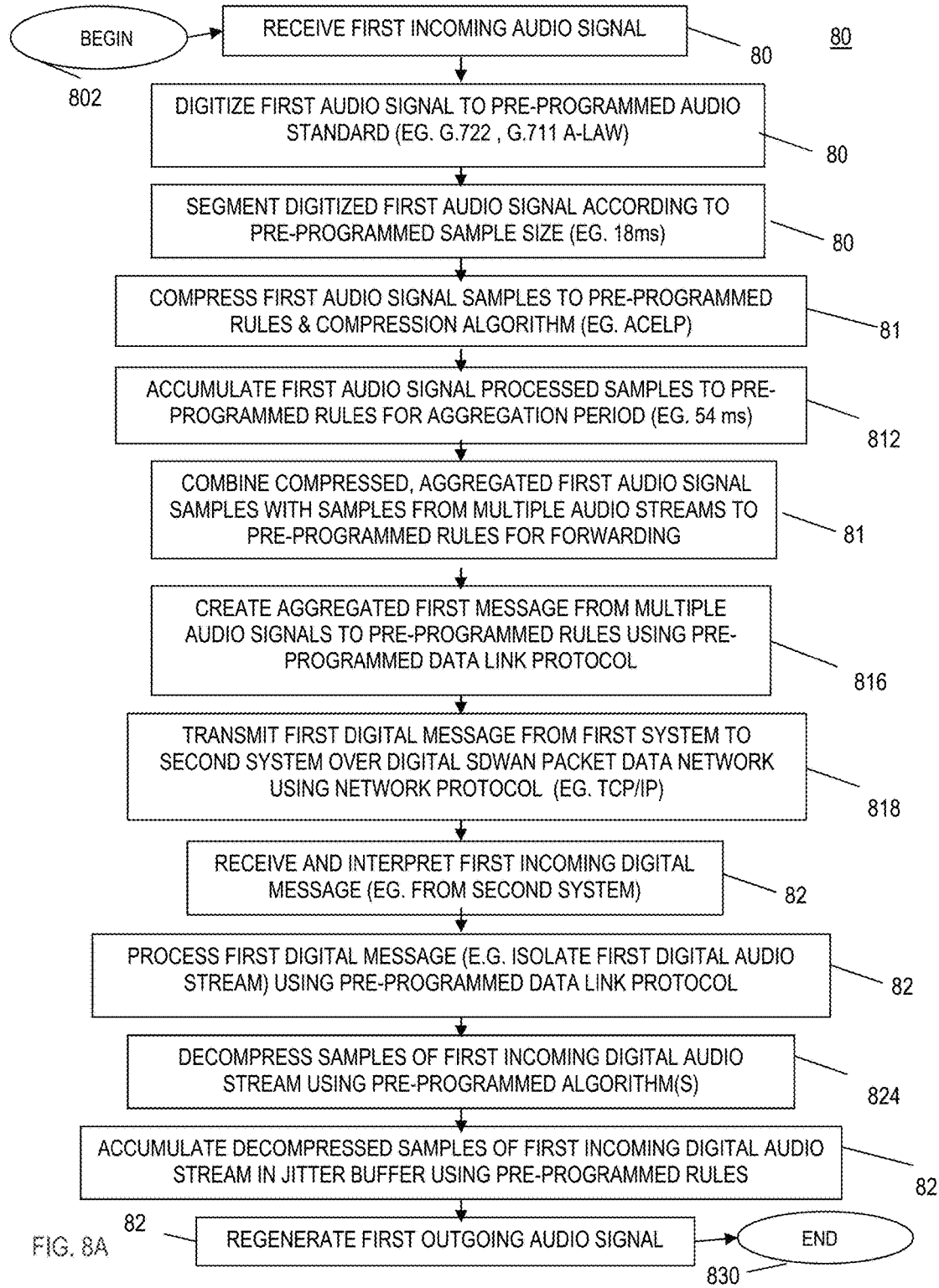
FIG. 8A depicts an exemplary flow diagram, according to an exemplary embodiment of an exemplary first system, in accordance with an exemplary embodiment.

FIG. 8A depicts an exemplary flow diagram 800 which, according to an exemplary embodiment, may describe exemplary functionality as may be performed by an exemplary first system embodiment. According to other exemplary embodiments, alternative exemplary system(s) need not necessarily perform any or all of the elements of flow diagram 800 in any particular sequence, but rather may process any incoming and/or any outgoing, exemplary signal(s) and/or message(s), e.g., but not limited to, in parallel and/or in serial fashion, which may further include, e.g., but not limited to, one or more unidirectional and/or bidirectional transmission(s)/reception(s), in any of various well known manner(s), and/or indeed may include, e.g., but not limited to, a looping process of a stream of such signal(s) and/or message(s) which may include, e.g., but not limited to, from time to time, continually and/or in one or more burst(s), transfer, communication, and/or transmission to another subsystem of a same system, and/or to a different system over a communications link such as, e.g., but not limited to, a data network, etc. To be clear, reference herein to a first or second subsystem, and/or first or second signal(s) or message(s), do not imply any sequence, but are rather to distinguish between different and/or similar subsystems of one or more systems, or supersystems, according to various exemplary but nonlimiting embodiments. Flow diagram 800, according to an exemplary embodiment may begin with 802 and may continue immediately with 804.

In 804, an exemplary first system may receive exemplary first incoming audio signal. From 804, flow diagram 800 may continue with 806.

In 806, the exemplary first system may process (e.g., digitize) the first incoming analog audio signal and generate a first digital audio stream which may comply to a pre-programmed audio standard such as, e.g. but not limited to G.722 or G.711 A-Law or G.711μ-Law. From 806, flow diagram 800 may continue with 808.

In 808, the exemplary first system may segment the said first digital audio stream according to one or more preprogrammed rule (s) to generate a sequence of samples of pre-programmed size. From 808, flow diagram 800 may continue with 810.

In 810, the exemplary first system may compress or not compress the said segmented first digital audio stream samples according to one or more preprogrammed rule(s), which may depend on, e.g., but not limited to the end-to-end throughput characteristics of the network, the number of simultaneous calls currently on progress, etc., using one of pre-programmed compression algorithms e.g., but not limited to any algorithm optimized for voice compression or silence suppression, to generate a sequence of processed samples. From 810, flow diagram 800 may continue with 812.

In 812, the exemplary first system may accumulate said first digital audio stream processed samples according to one or more preprogrammed rule(s), which may depend on, e.g., but not limited to the end-to-end throughput characteristics of the network, a pre-specified forwarding period, a pre-specified number of processed samples, the number of simultaneous calls currently on progress etc., to generate a first group of processed samples. From 812, flow diagram 800 may continue with 814.

In 814, the exemplary first system may combine said first group of processed samples from said first incoming audio stream with groups of samples from other incoming audio streams according to one or more preprogrammed rule(s), which may depend on, e.g. but not limited to, a pre-specified forwarding period, a packet throughput limit for the network, etc., to generate a first batch of processed samples to be transmitted. From 814, flow diagram 800 may continue with 816.

In 816, the exemplary first system may create a first digital message containing the said first batch of processed samples according to one or more preprogrammed rule(s), which may define, e.g. but not limited to a pre-specified data link protocol. From 816, flow diagram 800 may continue with 818.

In 818, the exemplary first system may create a first digital message in a single network compatible data packet or sequence of data packets containing the said single digital message according to one or more preprogrammed rule(s), for transmission across the network from the first system to the second system over a SDWAN packet data network which may define, e.g. but not limited to a pre-specified network protocol. From 818, flow diagram 800 may continue with 820.

In 820, an exemplary first system may receive and interpret first incoming digital messages e.g., from the exemplary second system. From 820, flow diagram 800 may continue with 822. Although not shown, it will be apparent to those skilled in the art that various steps of flow diagram 800, such as, e.g. but not limited to, 804 and 820 etc., may be performed in parallel, and continually, according to an alternative exemplary embodiment.

In 822, exemplary first incoming digital messages may be processed by the exemplary first system according to one or more preprogrammed rule(s), which may define, e.g. but not limited to a pre-specified data link protocol which may separate the contents of said first incoming digital message into independent digital audio streams. From 822, flow diagram 800 may continue with 824.

In 824, the exemplary first system may process any compressed digital audio stream samples according to one or more preprogrammed algorithms. From 824, flow diagram 800 may continue with 826.

In 826, the exemplary first system may accumulate said processed samples from said first incoming digital audio stream and store temporarily in an output or "jitter" buffer according to one or more preprogrammed rule(s), which may depend on, e.g., but not limited to the end-to-end jitter characteristics of the network. From 826, flow diagram 800 may continue with 828.

In 828, the exemplary first system may regenerate first outgoing audio signals. From 828, flow diagram 800 may continue immediately to 830, where flow diagram 800 may end. In another exemplary embodiment, exemplary flow diagram 800 need not be in serial form, but may rather run 804, 806, 808, 810, 812, 814, 816 and 818, and in parallel, 820, 822, 824, 826, and 828, and may loop back continually to 804 and 820, respectively in an exemplary embodiment.

According to another exemplary embodiment, a second system may similarly perform the exemplary steps noted above with reference to FIG. 8A, communicating to an exemplary first system.

According to another exemplary embodiment, in addition to the exemplary first system according to FIG. 8A, the process may continue, e.g., with similar functionality by a second system in communication with the first system.

Figure 8B:
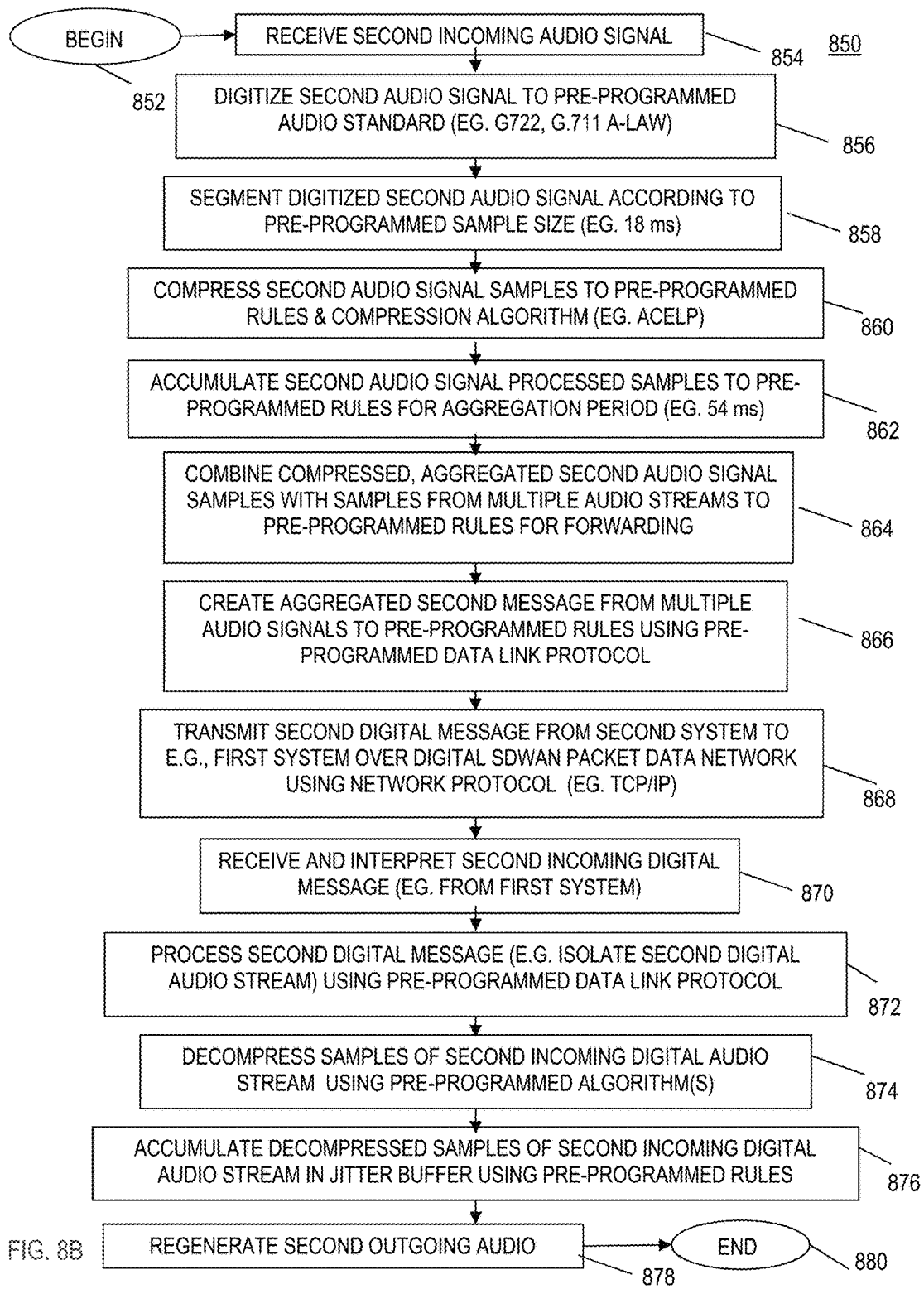
FIG. 8B depicts an exemplary flow diagram, according to an exemplary embodiment of an exemplary second system, in accordance with an exemplary embodiment.

FIG. 8B depicts an exemplary flow diagram 850, which, according to an exemplary embodiment, may describe exemplary functionality as may be performed by an exemplary second system exemplary embodiment. According to other exemplary embodiments, alternative exemplary system(s) need not necessarily perform any or all of the elements of flow diagram 850 in any particular sequence, but rather may process any incoming and/or any outgoing, exemplary signal(s) and/or message(s), e.g., but not limited to, in parallel and/or in serial fashion, which may further include, e.g., but not limited to, one or more unidirectional and/or bidirectional transmission(s)/reception(s), in any of various well known manner(s), and/or indeed may include, e.g., but not limited to, a looping process of a stream of such signal(s) and/or message(s) which may include, e.g., but not limited to, from time to time, continually and/or in one or more burst(s), transfer, communication, and/or transmission to another subsystem of a same system, and/or to a different system over a communications link such as, e.g., but not limited to, a data network, etc. To be clear, reference herein to a first or second subsystem, and/or first or second signal(s) or message(s), do not imply any sequence, but are rather to distinguish between different and/or similar subsystems of one or more systems, or supersystems, according to various exemplary but nonlimiting embodiments. Flow diagram 850, according to an exemplary embodiment may begin with 852 and may continue immediately with 854.

In 854, an exemplary second system may receive exemplary second incoming audio signal. From 854, flow diagram 850 may continue with 856.

In 856, the exemplary second system may process (e.g., digitize) the second incoming audio signal to generate a second digital audio stream which may comply to a pre-programmed audio standard such as, e.g. but not limited to G.722 or G.711 A-Law or G.711μ-Law. From 856, flow diagram 850 may continue with 858.

In 858, the exemplary second system may segment the said second digital audio stream according to one or more preprogrammed rule (s) to generate a sequence of samples of pre-programmed size. From 858, flow diagram 850 may continue with 860.

In 860, the exemplary second system may compress or not compress the said segmented second digital audio stream samples according to one or more preprogrammed rule(s), which may depend on, e.g., but not limited to, the end-to-end throughput characteristics of the network, the number of simultaneous calls currently on progress, etc., using one of pre-programmed compression algorithms e.g., but not limited to any algorithm optimized for voice compression or silence suppression, to generate a sequence of processed samples. From 860, flow diagram 850 may continue with 862.

In 862, the exemplary second system may accumulate said second digital audio stream processed samples according to one or more preprogrammed rule(s), which may depend on, e.g., but not limited to, the end-to-end throughput characteristics of the network, a pre-specified accumulation period, a pre-specified number of samples, the number of simultaneous calls currently on progress, etc., to generate a second group of processed samples. From 862, flow diagram 850 may continue with 864.

In 864, the exemplary second system may combine said second group of samples from said second incoming audio stream with groups of samples from other incoming audio signals according to one or more preprogrammed rule(s), which may depend on, e.g. but not limited to a pre-specified forwarding period, a packet throughput limit for the network, etc., to generate a second batch of processed samples to be transmitted. From 864, flow diagram 850 may continue with 866.

In 866, the exemplary second system may create a single digital message containing the said second batch of processed samples according to one or more preprogrammed rule(s), which may define, e.g. but not limited to a pre-specified data link protocol. From 866, flow diagram 850 may continue with 868.

In 868, the exemplary second system may create a second digital message in a single network compatible data packet or sequence of data packets containing the said second digital message according to one or more preprogrammed rule(s), for transmission across the network from the second system to, e.g., the first system, over a SDWAN packet data network which may define, e.g. but not limited to a pre-specified network protocol. From 868, flow diagram 850 may continue with 870.

In 870, an exemplary second system may receive and interpret second incoming digital messages e.g., from the exemplary first system. From 870, flow diagram 850 may continue with 872. Although not shown, it will be apparent to those skilled in the art that various steps of flow diagram 850, such as, e.g. but not limited to, 854 and 870 etc., may be performed in parallel, and continually, according to an alternative exemplary embodiment.

In 872, exemplary second incoming digital messages may be processed by the exemplary second system according to one or more preprogrammed rule(s), which may define, e.g. but not limited to a pre-specified data link protocol which may separate the contents of said second incoming digital message into independent digital audio streams. From 872, flow diagram 850 may continue with 874.

In 874, the exemplary second system may process any compressed digital audio stream samples according to one or more preprogrammed algorithms. From 874, flow diagram 850 may continue with 876.

In 876, the exemplary second system may accumulate processed samples from said second incoming digital audio stream and store temporarily in an output or "jitter" buffer according to one or more preprogrammed rule(s), which may depend on, e.g., but not limited to the end-to-end jitter characteristics of the network. From 876, flow diagram 850 may continue with 878.

In 878, the exemplary second system may regenerate second outgoing audio signals. From 878, flow diagram 850 may continue immediately to 880, where flow diagram 850 may end. In another exemplary embodiment, exemplary flow diagram 850 need not be in serial form, but may rather run 854, 856, 858, 860, 862, 864, 866 and 868, and in parallel, 870, 872, 874, 876, and 878, and may loop back continually to 854 and 870, respectively in an exemplary embodiment.

Figure 9:
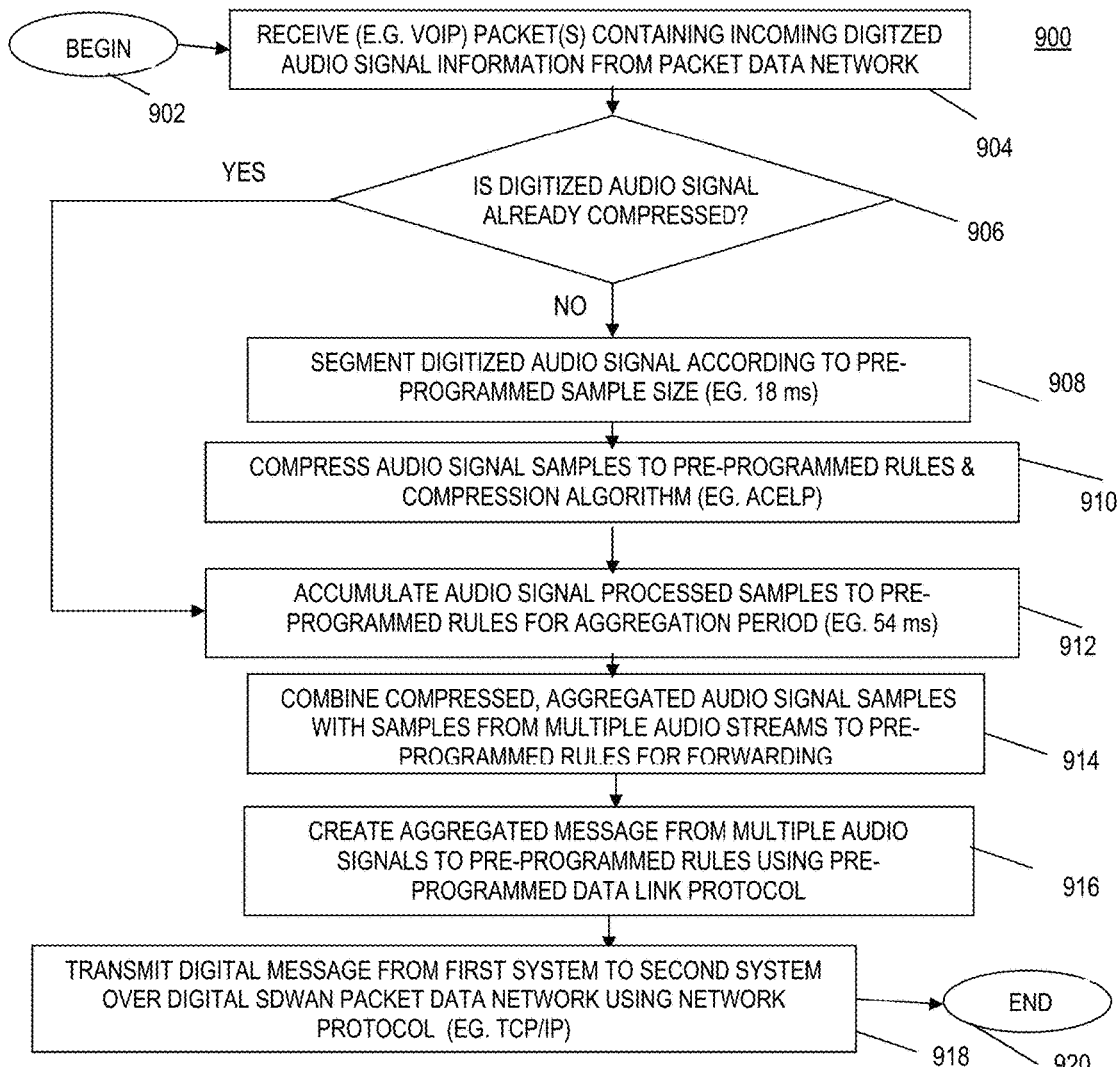
FIG. 9 depicts an exemplary flow diagram, according to an exemplary embodiment of another exemplary first system, in accordance with an exemplary embodiment.

FIG. 9 depicts an exemplary flow diagram 900, which, according to an exemplary embodiment, may describe exemplary functionality as may be performed by an exemplary combination system, which may refer to a first system, a second system, or one or more systems, subsystems and/or supersystems, according to various exemplary embodiments. According to other exemplary embodiments, alternative exemplary system(s) need not necessarily perform any or all of the elements of flow diagram 900 in any particular sequence, but rather may process any incoming and/or any outgoing, exemplary signal(s) and/or message(s), e.g., but not limited to, in parallel and/or in serial fashion, which may further include, e.g., but not limited to, one or more unidirectional and/or bidirectional transmission(s)/reception(s), in any of various well known manner(s), and/or indeed may include, e.g., but not limited to, a looping process of a stream of such signal(s) and/or message(s) which may include, e.g., but not limited to, from time to time, continually and/or in one or more burst(s), transfer, communication, and/or transmission to another subsystem of a same system, and/or to a different system over a communications link such as, e.g., but not limited to, a data network, etc. To be clear, reference herein to a first or second subsystem, and/or first or second signal(s) or message(s), do not imply any sequence, but are rather to distinguish between different and/or similar subsystems of one or more systems, or supersystems, according to various exemplary but nonlimiting embodiments.

Flow diagram 900, according to an exemplary embodiment may begin with 902 and may continue immediately with 904.

In 904, an exemplary first system may receive an exemplary packet and/or packets, which may contain first incoming audio signal information, the packets received from a packet data network of any of several well known types including, e.g., but not limited to, terrestrial, satellite, optical, wireless, and/or wireline, etc. From 904, flow diagram 900 may continue with 906. Audio frequency signal information may be in a VoIP packet or High Definition Voice packet, and may already be compressed, etc.

In 906, the exemplary first system may interpret the first incoming audio signal information according to a message protocol being used, e.g., but not limited to, any VoIP or High Definition Voice compression algorithm. From 906, if the first incoming audio signal information is not compressed the flow diagram 900 may continue with 908. From 906, if the first incoming audio signal information is already compressed the flow diagram 900 may continue with 912. Although not shown, it will be apparent to those skilled in the art that in an alternative embodiment an additional link between 906 and 908 may be added to decompress a first incoming audio signal that is already compressed.

In 908, the exemplary first system may segment the said first incoming uncompressed audio signal information according to one or more preprogrammed rule (s) to generate a sequence of samples of pre-programmed size. From 908, flow diagram 900 may continue with 910.

In 910, the exemplary first system may compress or not compress the said segmented first digital audio stream samples according to one or more preprogrammed rule(s), which may depend on, e.g., but not limited to, the end-to-end throughput characteristics of the network, the number of simultaneous calls currently on progress, etc., using one of pre-programmed compression algorithms e.g., but not limited to any algorithm optimized for voice compression or silence suppression, to generate a sequence of processed samples. From 910, flow diagram 900 may continue with 912.

In 912, the exemplary first system may accumulate said first digital audio stream processed samples according to one or more preprogrammed rule(s), which may depend on, e.g., but not limited to, the end-to-end throughput characteristics of the network, a pre-specified accumulation period, a pre-specified number of samples, the number of simultaneous calls currently on progress, etc., to generate a first group of processed samples. From 912, flow diagram 900 may continue with 914.

In 914, the exemplary first system may combine said first group of accumulated samples from said first incoming audio signal with groups of samples from other incoming audio signals according to one or more preprogrammed rule(s), which may depend on, e.g. but not limited to a pre-specified forwarding period, a packet throughput limit for the network, etc., to generate a first batch of processed samples to be transmitted. From 914, flow diagram 900 may continue with 916.

In 916, the exemplary first system may create a first digital message containing the said first batch of processed samples according to one or more preprogrammed rule(s), which may define, e.g. but not limited to a pre-specified data link protocol. From 916, flow diagram 900 may continue with 918.

In 918, the exemplary first system may create a first digital message in a single network compatible data packet or sequence of data packets containing the said single digital message according to one or more preprogrammed rule(s), for transmission across the network from the first system to the second system over a SDWAN packet data network which may define, e.g. but not limited to a pre-specified network protocol. From 918, flow diagram 900 may continue immediately to 930, where flow diagram 900 may end. In another exemplary embodiment, exemplary flow diagram 900 need not be in serial form, but may rather run 904, 906, 908, 910, 912, 914, 916 and 918 in parallel, and may loop back continually to 904 in an exemplary embodiment.

Figure 10:
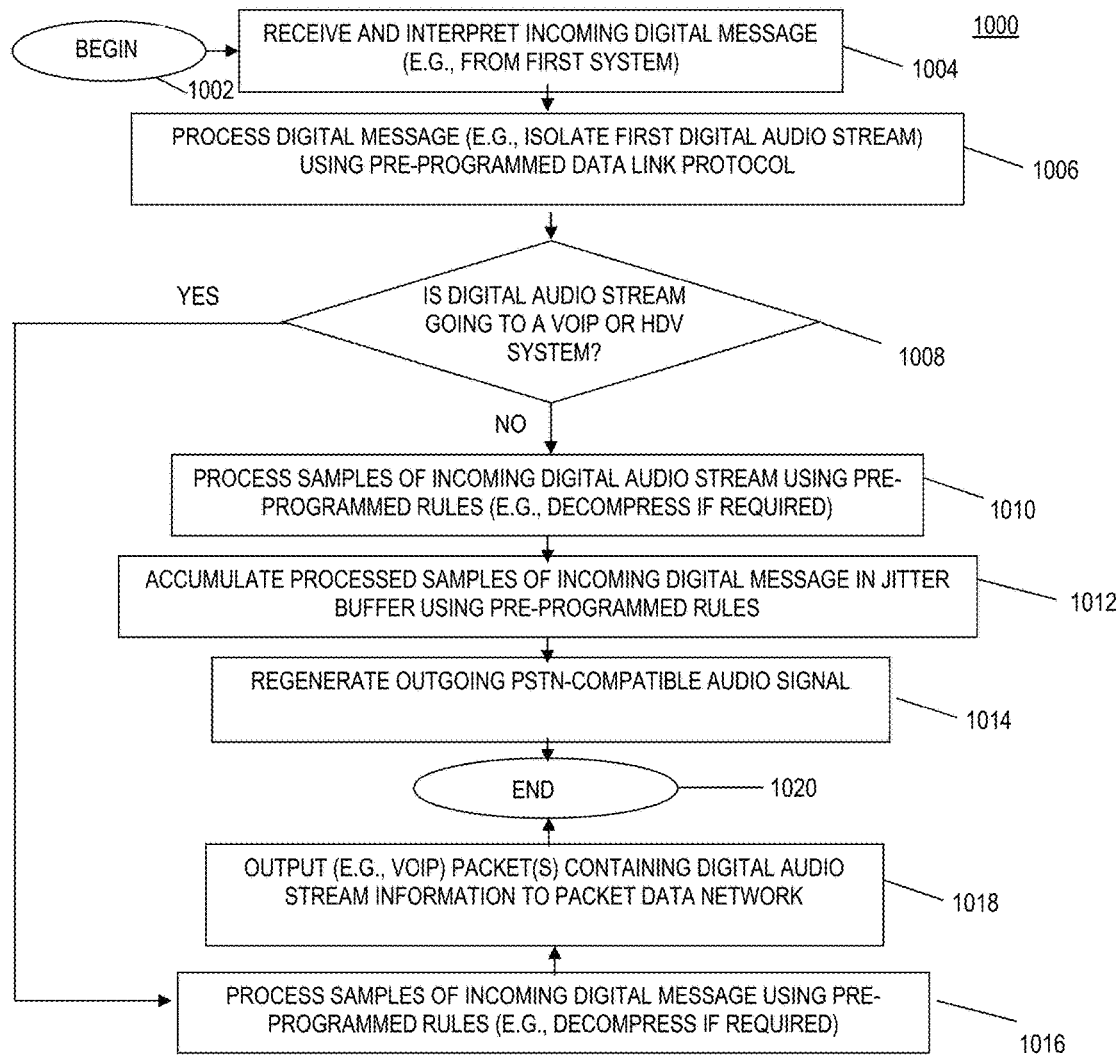
FIG. 10 depicts an exemplary flow diagram, according to an exemplary embodiment of another exemplary second system, in accordance with an exemplary embodiment.

According to another exemplary embodiment, in addition to the exemplary first system according to FIG. 9, the process may continue, e.g., with similar functionality by a second system in communication with the first system such as, e.g., but not limited to, the flow diagram of FIG. 10.

FIG. 10 depicts an exemplary flow diagram 1000, which, according to an exemplary embodiment, may describe exemplary functionality as may be performed by an exemplary combination system, which may refer to a first system, a second system, or one or more systems, subsystems and/or supersystems, according to various exemplary embodiments. According to other exemplary embodiments, alternative exemplary system(s) need not necessarily perform any or all of the elements of flow diagram 1000 in any particular sequence, but rather may process any incoming and/or any outgoing, exemplary signal(s) and/or message(s), e.g., but not limited to, in parallel and/or in serial fashion, which may further include, e.g., but not limited to, one or more unidirectional and/or bidirectional transmission(s)/reception(s), in any of various well known manner(s), and/or indeed may include, e.g., but not limited to, a looping process of a stream of such signal(s) and/or message(s) which may include, e.g., but not limited to, from time to time, continually and/or in one or more burst(s), transfer, communication, and/or transmission to another subsystem of a same system, and/or to a different system over a communications link such as, e.g., but not limited to, a data network, etc. To be clear, reference herein to a first or second subsystem, and/or first or second signal(s) or message(s), do not imply any sequence, but are rather to distinguish between different and/or similar subsystems of one or more systems, or super systems, according to various exemplary but nonlimiting embodiments.

Flow diagram 1000, according to an exemplary embodiment may begin with 1002 and may continue immediately with 1004.

In 1004, an exemplary second system may receive and interpret first incoming digital messages e.g., from the exemplary first system. From 1004, flow diagram 1000 may continue with 1006.

In 1006, exemplary first incoming digital messages may be processed by the exemplary second system according to one or more preprogrammed rule(s), which may define, e.g. but not limited to a pre-specified data link protocol which may separate the contents of said first incoming digital message into independent digital audio streams. From 1006, flow diagram 1000 may continue with 1008.

In 1008, the exemplary second system may interpret the first incoming digital audio stream according to a message protocol being used, e.g., but not limited to, any High Definition Voice system, or VoIP system or algorithm. From 1008, if the first incoming audio stream is not coupled with or connected to a VoIP or High Definition Voice (HDV) system the flow diagram 1000 may continue with 1010. From 1008, if the first incoming digital audio stream is coupled with or connected to a VoIP o or High Definition Voice system the flow diagram 1000 may continue with 1016.

In 1010, the exemplary second system may process which may include, e.g., but not limited to decompress the digital audio stream samples according to one or more preprogrammed rules. From 1010, flow diagram 1000 may continue with 1012.

In 1012, the exemplary second system may accumulate processed samples from said second incoming digital audio stream and store temporarily in a "jitter" buffer according to one or more preprogrammed rule(s), which may depend on, e.g., but not limited to the end-to-end jitter characteristics of the network. From 1012 flow diagram 1000 may continue with 1014.

In 1014, the exemplary second system may regenerate second outgoing audio signals. From 1014, flow diagram 1000 may continue immediately to 1020, where flow diagram 1000 may end. In another exemplary embodiment, exemplary flow diagram 1000 need not be in serial form, but may rather run 1004, 1004, 1006, followed by 1008, 1010, 1012, 1014, or 1016 and 1018, and may loop back continually to 1004 in an exemplary embodiment.

In 1016, the exemplary second system may process samples of the incoming digital audio stream which may include, e.g., but not limited to decompress the digital audio stream samples according to one or more preprogrammed rules and which may provide functions to connect to or couple with a VoIP communications device or a VoIP gateway or a High Definition Voice communications device or system. From 1016, flow diagram 1000 may continue with 1018.

In 1018, the exemplary second system may transmit an exemplary packet and/or packets, which may contain first incoming digital audio signal information in the form of e.g., VoIP packets or High Definition Voice packets, the packets transmitted to a packet data network of any of several well known types including, e.g., but not limited to, terrestrial, satellite, optical, wireless, and/or wireline, etc. From 1018, flow diagram 1000 may continue with 1020 or loop back to 1004.

According to another exemplary embodiment, in addition to the exemplary second system according to FIG. 10, the process may continue (or proceed in parallel), e.g., with similar functionality by a second system in communication with the first system such as, e.g., but not limited to, the flow diagram of FIG. 9.

Although certain exemplary embodiments may have the first and second exemplary systems arranged horizontally (i.e., forming a symmetric signal path as in FIG. 3 and FIG. 7), alternatively, in other exemplary embodiments, the first and second exemplary systems may be arranged vertically processing different types of exemplary traffic.

Specifically, in some exemplary embodiments (see, e.g., as illustrated in, FIG. 5) an exemplary system one may interface to the PSTN one end and may be coupled to a private branch exchange, key system or directly to an analog communications device on the other end, and then the system two may interface to a private branch exchange, key system or directly to an analog communications device one end and may be coupled to the PSTN on the other end.

In other exemplary embodiments (see, e.g., as illustrated in, FIG. 6) an exemplary system one may interface to a PSTN compatible system on one end and may be coupled to a data network on the other end, and then the system two may interface to the data network on one end and be coupled to the PSTN compatible system on the other end.

In other alternative exemplary embodiments, the first and second systems may be directly coupled to two separate WAN links, one or both of which may connect to a SDWAN packet data network.

In other alternative exemplary embodiments, the first and second systems may be simultaneously coupled with multiple other devices and may form a mesh network of connections of which at least one may be to a SDWAN packet data network.

FIG. 11 depicts an exemplary flow diagram 1100, which, according to an exemplary embodiment, may describe exemplary functionality as may be performed by an exemplary first system, or part of an exemplary combination system, which may refer to a first system, a second system, or one or more systems, subsystems and/or super systems, according to various exemplary embodiments. According to other exemplary embodiments, alternative exemplary system(s) need not necessarily perform any or all of the elements of flow diagram 1100 in any particular sequence, but rather may process any incoming and/or any outgoing, exemplary signal(s) and/or message(s), e.g., but not limited to, in parallel and/or in serial fashion, which may further include, e.g., but not limited to, one or more unidirectional and/or bidirectional transmission(s)/reception(s), in any of various well known manner(s), and/or indeed may include, e.g., but not limited to, a looping process of a stream of such signal(s) and/or message(s) which may include, e.g., but not limited to, from time to time, continually and/or in one or more burst(s), transfer, communication, and/or transmission to another subsystem of a same system, and/or to a different system over a communications link such as, e.g., but not limited to, a data network, etc. To be clear, reference herein to a first or second subsystem, and/or first or second signal(s) or message(s), do not imply any sequence, but are rather to distinguish between different and/or similar subsystems of one or more systems, or super systems, according to various exemplary but nonlimiting embodiments.

Flow diagram 1100, according to an exemplary embodiment may begin with 1102 and may continue immediately with 1104.

In 1104, as illustrated in flow diagram 1100, an exemplary first system may set certain thresholds used by an exemplary first system, said thresholds may be fixed or may be modified later by an exemplary first system according to preprogrammed rules. From 1104, flow diagram 1100 may continue with 1106.

In 1106, as illustrated in flow diagram 1100, the exemplary first system may receive a first digital audio stream, said stream may comply with an audio standard such as, e.g. but not limited to G.722 or G.711 A-Law or G.711 µ-Law. From 1106, flow diagram 1100 may continue with 1108.

In 1108, as illustrated in flow diagram 1100, the exemplary first system may segment the said first digital audio stream according to one or more preprogrammed rule (s) to generate a sequence of samples of pre-programmed size. From 1108, flow diagram 1100 may continue with 1110.

In 1110, as illustrated in flow diagram 1100, the exemplary first system may compress or not compress the said segmented first digital audio stream samples according to one or more preprogrammed rule(s), which may depend on, e.g., but not limited to the end-to-end throughput characteristics of the network, the number of simultaneous calls currently on progress, etc., using one of pre-programmed compression algorithms e.g., but not limited to any algorithm optimized for voice compression or silence suppression, to generate a sequence of processed samples. From 1110, flow diagram 1100 may continue with 1112.

In 1112, as illustrated in flow diagram 1100, the exemplary first system may accumulate said first digital audio stream processed samples in an aggregation buffer. From 1112, flow diagram 1100 may continue with 1114.

In 1114, as illustrated in flow diagram 1100, the exemplary first system may compare the contents of the aggregation buffer to a threshold, said threshold may be fixed or may be calculated according to one or more preprogrammed rule(s), which may depend on, e.g., but not limited to the end-to-end throughput characteristics of the network, a pre-specified forwarding period, a pre-specified number of processed samples, the number of simultaneous calls currently on progress etc., and if the threshold is determined to be reached, then flow diagram 1000 may continue with 1122 and if the threshold is determined not to have been reached, then flow diagram 1100 may continue with 1116.

In 1116, as illustrated in flow diagram 1100, logic of the exemplary first system may determine whether the incoming audio signal has ended, and if so, then flow diagram may continue with 1120 where the upper portion of flow diagram 1100 may end, and if it is determined that the incoming audio signal has not ended, then flow diagram 1100 may continue with 1118. In another exemplary embodiment, exemplary flow diagram 1100 need not end and may loop back continually to 1102 or to 1104 in another exemplary embodiment.

In 1118, as illustrated in flow diagram 1100, the exemplary first system may calculate a new aggregation threshold according to one or more preprogrammed rule(s), which may depend on, e.g., but not limited to the end-to-end throughput characteristics of the network, a pre-specified forwarding period, a pre-specified number of processed samples, the number of simultaneous calls currently on progress etc. In another exemplary embodiment, exemplary flow diagram 1100 may recalculate a new aggregation threshold e.g. but not limited to, at the end of an incoming signal, at pre-determined time intervals, never. From 1118, flow diagram 1100 may continue with 1106.

In 1124, as illustrated in flow diagram 1100, the exemplary first system may combine the first group of processed samples from said first incoming audio stream with groups of samples from other incoming audio streams to create a batch of samples ready for transmission to a second system. From 1124, flow diagram 1100 may continue with 1126.

In 1126, as illustrated in flow diagram 1100, the exemplary first system may determine if the forwarding threshold has been reached, said threshold may be fixed or may be calculated according to one or more preprogrammed rule(s), which may depend on, e.g., but not limited to the end-to-end throughput characteristics of the network, a pre-specified forwarding period, the number of simultaneous calls currently on progress, a pre-specified throughput limit in eg. but not limited to, a number of packets per second, etc., and if the threshold is determined to be reached, then flow diagram 1100 may continue with 1128 and if the threshold is determined not to have been reached, then flow diagram 1100 may continue with 1134

In 1128, as illustrated in flow diagram 1100, the exemplary first system may calculate and set the next forwarding threshold. From 1128, flow diagram 1100 may continue with 1130.

In 1130, as illustrated in flow diagram 1100, the exemplary first system may create a single digital message containing the said batch of processed samples according to one or more preprogrammed rule(s), which may define, e.g. but not limited to a pre-specified data link protocol. From 1130, flow diagram 1100 may continue with 1132.

1132, as illustrated in flow diagram 1100, the exemplary first system may create a digital message in a single network compatible data packet or sequence of data packets containing the said single digital message according to one or more preprogrammed rule(s), for transmission across the network from the first system to the second system over a SDWAN data network which may define, e.g. but not limited to a pre-specified network protocol. 1132, flow diagram 1100 may continue with 1134.

1134, as illustrated in flow diagram 1100, the exemplary first system may calculate a new forwarding threshold according to one or more preprogrammed rule(s), which may depend on, e.g., but not limited to the end-to-end throughput characteristics of the network, a pre-specified forwarding period, the number of simultaneous calls currently on progress, a pre-specified throughput limit in e.g., but not limited to, a number of packets per second, etc. In another exemplary embodiment, exemplary flow diagram 1100 may recalculate a new forwarding threshold e.g. but not limited to, at the end of an incoming signal, at pre-determined time intervals, never. From 1134, flow diagram 1100 may continue with 1124 and may loop back continually to 1124.

It is important to note that all exemplary flow diagrams are deemed to be of an example nature, and are intended not to be limited, but rather exemplary in nature to ease those of ordinary skill in the relevant art to more easily make and use the claimed inventions. Although not shown, it will be apparent to those skilled in the art that various steps of flow diagram 1100, may be performed in parallel, serially, and/or continually, or in a different order, according to an alternative exemplary embodiment.

According to another exemplary embodiment, in addition to the exemplary first system according to FIG. 11, the process may continue (or proceed in parallel), e.g., with similar functionality by a second system in communication with the first system such as, e.g., but not limited to, the flow diagram of FIG. 9.

First Exemplary Embodiments for Connecting or Coupling Audio Communications Systems Over a SD WAN Packet Data Network In an exemplary embodiment, device 100 (i.e., 100a, 100b, 100c, 100d, 100e, collectively "device 100") may provide the ability to receive audio 206 signals, such as, for example, e.g., but not limited to, from an analog line or from a digital TDM link, and decode these signals. While exemplary attributes such as PSTN 206 line, analog line, FXS, FXO, E&M, TDM link, or T1 and E1 trunks may be described, the foregoing terminology are employed for illustrative purposes only and are in no way to be construed as limitations of the present embodiments.

In an exemplary embodiment, device 100 may provide the ability to convert between transmission protocols, such as, e.g., but not limited to, from a TDM data structure to IP, and back again. An exemplary feature of the equipment described may be the ability to provide a connection path for TDM links as transparently as possible to the systems connected at both ends, regardless of the transport medium and any intermediate protocols used to provide the connection. Two variables that may be accommodated in order for the proposed solution to be flexible and operate with a wide variety of potential network solutions include, e.g., but are not limited to, (i) accommodation for a wide potential variation in time delay across the network path, and (ii) buffering to allow the continuous operation of the transmission protocol, such as, e.g., exemplary TDM circuits, while receiving and transmitting discontinuous data packets over the network, such as, e.g., exemplary IP connection or coupling (for example, to compensate for gaps between blocks of information received from the packet data networks 310 that need to be continuously transmitted without a break over the TDM circuit).

As outlined above, the basic method of operation of a packet based data network 310 may include that of accumulating information for a period of time and then transmitting it in a burst of data known as a packet. There is therefore a period of accumulation during which time the data may be stored at the transmitting end of the link, a processing delay while the "packet" is created, a period of packet transmission, a period of accumulation at the receiving end of the link, a period of processing at the receiving end of the link and finally a period of transmission to the local equipment. The actual delays incurred may vary considerably from packet to packet. In addition to the variations in packet delay incurred during the process described above, additional very significant delays may be incurred traversing the network architecture, specifically in the case of some cellular wireless and satellite links but also over international links such as, e.g., but not limited to, through gateways between public IP data networks (not shown).

Referring to FIG. 3, in this embodiment both the analog communication systems 302 and 308 may be connected or coupled to the described devices 100a, and 100b and may exchange transmissions across a SDWAN packet data network. Audio signals may be received by device 100a, processed according preprogrammed rules, converted to a symbol stream, merged with other symbol streams from other audio signals, and may be transmitted to the other device 100b over the network 310. At the receiving side 100b of network 310 the received symbols may be separated into independent audio streams, each independent stream may be processed according to preprogrammed rules, buffered in an exemplary output or jitter buffer (not shown) within device 100b for a period of time to accommodate variations in delay over network 310, after which the symbols may be transmitted to the attached system 308 as audio signals using the appropriate analog or digital structure of communication with system 308.

In an exemplary embodiment, audio signals may be transmitted between the devices 100 over network 310 within a sufficient time period that audio signals may be regenerated at the receiving side of devices 100 without a break in the audio. Any delay beyond that accommodated by the exemplary jitter buffers of devices 100, or any loss of packet information at a receiving device 100 may lead to a break in the timely transmission of the audio signal to the attached systems 302, 308 which may in turn cause an interruption and possibly in some circumstances an eventual failure of the communications. Such failure in communications may typically be caused by irrecoverable loss of critical audio and/or a procedural timeout during a PSTN call, e.g., but not limited to a facsimile or dial-modem data call.

As outlined above, conventional VoIP and High Definition Voice systems typically generate a continuous stream of IP packets for every call in progress. In an attempt to reduce the bandwidth required to support conventional VoIP calls a voice compression algorithm is sometimes used, and in such cases the IP overhead associated with each packet may often exceed the size of the compressed audio payload by several factors. Additionally, both conventional VoIP systems and High Definition Voice systems generate an independent IP packet stream for each call in progress even though said calls may be traversing the same network connections. Furthermore, VoIP systems often create additional large IP packets to initiate a VoIP call, e.g., using a Session Initiation Protocol (SIP). As a consequence of these processes, VoIP systems often generate a large number of packets, the majority of each packet consisting of IP packet overhead which can greatly increase loading on the network and consequently the likelihood of packets being delayed or discarded if there are bandwidth or packet processing bottlenecks within the network.

In accordance with an exemplary embodiment of the present invention conventional VoIP or High Definition Voice systems may be improved upon to reduce the likelihood of packets being delayed or discarded by a SDWAN packet data network. In the applications of interest, which may include the transmission of multiple audio signals between devices 100 over a SDWAN packet data network, a combination of techniques and preprogrammed rules are used to optimize the packet stream for the communication of a single and/or of many simultaneous audio signals between devices 100 over a SDWAN packet data network.

Referring again to FIG. 3 and FIG. 5 in an exemplary embodiment, devices 100 can receive audio signals from PSTN compatible devices and decode any audio tones which or may not be present to determine which of a plurality of compression techniques and preprogrammed rules may be applied to the audio signal being received, e.g., but not limited to a facsimile transmission, a dial-modem transmission, DTMF or FSK key detection. Additionally devices 100 may determine based on preprogrammed rules that audio stream samples may be passed uncompressed to subsequent stages of processing within the device 100 based on e.g., but not limited to the number of current active calls in progress.

In an exemplary embodiment, device 100 can receive audio tones from PSTN lines and decode these tones as DTMF, FSK, PSK, QAM or other encoded signal types and which signal types are all considered audio tones or signals for the current description. Device 100 can also transmit audio tones to PSTN 206 lines and encode these tones as DTMF, FSK, PSK, QAM or other encoded signal types and which signal types are all considered audio tones or signals for the current description.

In an exemplary embodiment, devices 100 can aggregate compressed or uncompressed audio samples from one or more audio signals and store and delay forwarding for transmission based on preprogrammed or learned rules which may depend e.g., but not limited to the number of current active calls in progress.

In an exemplary embodiment, devices 100 can exchange messages over network 310 using a preprogrammed link level protocol and message format optimized for communication over a SDWAN packet data network. Said link level protocol may provide the ability to establish pier to pier connections between devices 100 so that call connect times are greatly reduced compared to standard VoIP systems or are eliminated completely. Said link level protocol may provide the ability to combine/separate multiple compressed or uncompressed audio streams which may be using the same or different audio compression techniques into one packet stream. Said link level protocol may be operable according to preprogrammed or learned rules.

Second Exemplary Embodiments for Connecting Audio Communications Systems Over a SDWAN Packet Data Network Referring to FIG. 6 and FIG. 7 in an exemplary embodiment, devices 100 can receive audio samples from VoIP or High Definition Voice compatible devices and process said samples using preprogrammed or learned rules for the transmission of said samples over a SDWAN packet data network using the aforementioned exemplary processes of devices 100.

Referring to FIG. 6, in an exemplary embodiment 600, device 100c provides the ability to receive VoIP or High Definition Voice packets directly, such as, e.g., but not limited to from a VoIP service provider or a VoIP communications device, or a High Definition Voice communications device and act as a gateway converting these packets to wideband analog 206 signals (not illustrated), or as illustrated, regenerated as PSTN compatible audio signals by the receiving device 100d connected directly to PSTN compatible communication system 302 by an analog line or a TDM link. While exemplary attributes such as VoIP and compression may be described, the foregoing terminology is employed for illustrative purposes only and is in no way to be construed as limitations of the present embodiments.

Referring to FIG. 7, in an exemplary embodiment 700, devices 100c and 100e provide the ability to receive VoIP packets directly, from, e.g., but not limited to a VoIP service provider or a VoIP communications device. In an exemplary embodiment 700, devices 100c and 100e provide the ability to receive High Definition Voice packets directly, from, e.g., but not limited to a High Definition Voice service provider or a High Definition Voice communications device (not illustrated). Devices 100 can have the ability to decompress, compress or leave unchanged the VoIP or High Definition Voice audio payload, can eliminate the IP packet overhead, can aggregate and combine the VoIP audio stream with other VoIP or High Definition Voice or non-VoIP PSTN compatible audio streams incoming to the device 100, and can transmit to another device 100 over a SDWAN packet network in a single packet stream using a link level protocol optimized for communication over a packet data network. A device 100 receiving the said optimized link level packet stream can use preprogrammed or learned rules to separate out the individual audio streams, can decompress, compress or leave unchanged the VoIP audio payload, can regenerate the IP packet information, and can buffer and retransmit the reconstituted VoIP or High Definition Voice packet stream to a connected e.g., but not limited to a VoIP or High Definition Voice service provider or a VoIP or High Definition Voice communications device.

An Exemplary Computer System

Figure 4:
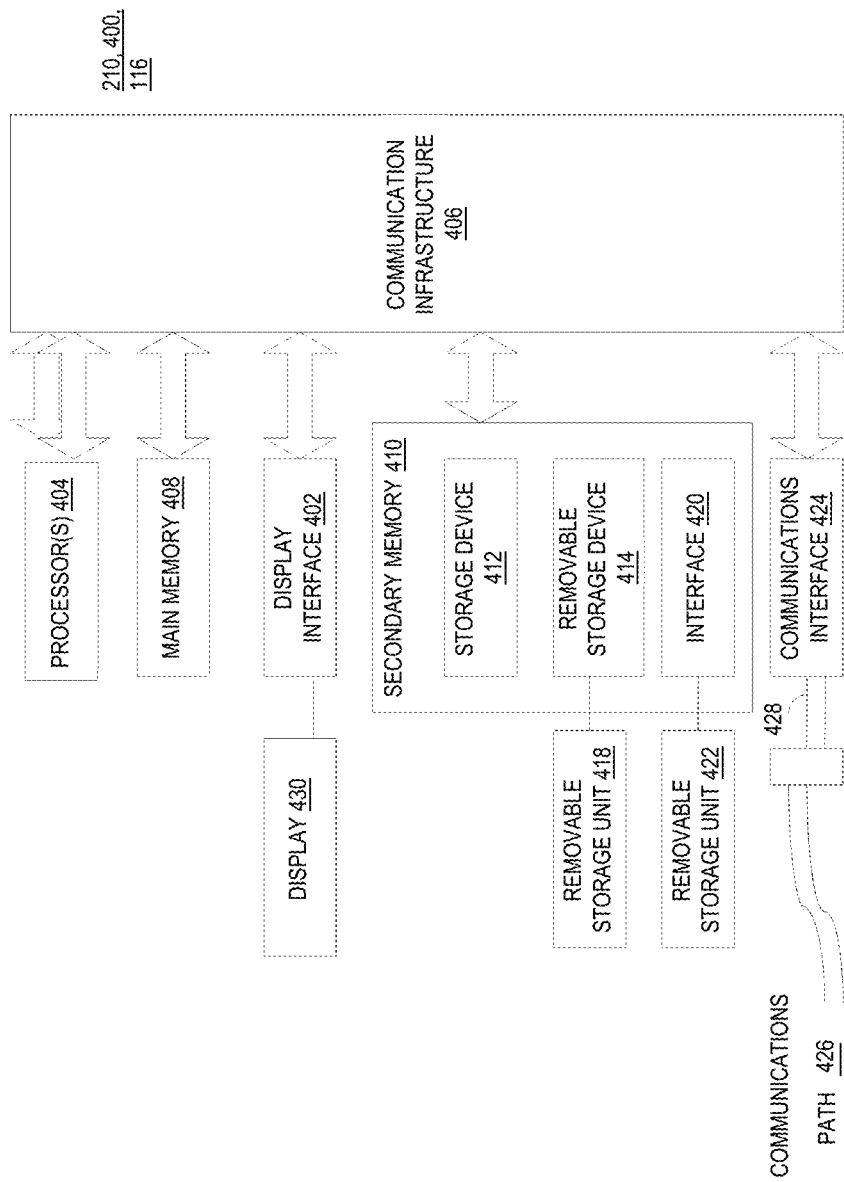
FIG. 4 illustrates an exemplary embodiment of a computer system that may be used to practice the system and/or methods in accordance with the various exemplary embodiments.

FIG. 4 depicts an exemplary embodiment of a computer system 400 that may be used in association with, in connection with, and/or in place of, but not limited to, computer platform 116, according to exemplary embodiments of the present invention.

The present embodiments (or any part(s) or function(s) thereof) may be implemented using hardware, software, firmware, or a combination thereof and may be implemented in one or more computer systems or other processing systems. In fact, in one exemplary embodiment, the invention may be directed toward one or more computer systems capable of carrying out the functionality described herein. An example of a computer system 400 is shown in FIG. 4, depicting an exemplary embodiment of a block diagram of an exemplary computer system useful for implementing the present invention. Specifically, FIG. 4 illustrates an example computer 400, which in an exemplary embodiment may be, e.g., (but not limited to) a personal computer (PC) system running an operating system such as, e.g., (but not limited to) WINDOWS MOBILE™ for POCKET PC, or MICROSOFT® WINDOWS® NT/98/2000/XP/CE/, etc. available from MICROSOFT® Corporation of Redmond, Wash., U.S.A., SOLARIS® from SUN® Microsystems of Santa Clara, Calif., U.S.A., OS/2 from IBM® Corporation of Armonk, N.Y., U.S.A., MAC/OS, MAC/OSX, IOS, etc. from APPLE® Corporation of Cupertino, Calif., U.S.A., etc., or any of various versions of UNIX® (a trademark of the Open Group of San Francisco, Calif., USA) including, e.g., LINUX®, HPUX®, IBM AIX®, and SCO/UNIX®, etc. However, the invention may not be limited to these platforms. Indeed aspects of systems may include devices with various other input and/or output subsystems including, e.g., but not limited to, tablet displays, keyboards, various sensor(s), touch screen sensors, pressure sensors, location sensors (e.g., global positioning system (GPS), etc.), accelerometers, multi-dimensional sensor(s), temporal based datalogs, etc. Instead, the invention may be implemented on any appropriate computer system running any appropriate operating system. In one exemplary embodiment, the present invention may be implemented on a computer system operating as discussed herein. An exemplary computer system, computer 400 is shown in FIG. 4. Other components of the invention, such as, e.g., (but not limited to) a computing device, a communications device, a telephone, a personal digital assistant (PDA), a personal computer (PC), a handheld PC, client workstations, thin clients, thick clients, proxy servers, network communication servers, remote access devices, client computers, server computers, peer-to-peer devices, tablets, touch-enabled devices, sensor enabled devices, location sensing devices, convertible, table/laptop, mobile, smart devices, smart phones, phablets, wearable technology, watch devices, glass devices, routers, web servers, data, media, audio, video, telephony or streaming technology servers, etc., may also be implemented using a computer such as that shown in FIG. 4 and/or additional subsystems perhaps not all shown, as discussed.

The computer system 400 may include one or more processors, such as, e.g., but not limited to, processor(s) 404. The processor(s) 404 may be connected to a communication infrastructure 406 (e.g., but not limited to, a communications bus, cross-over bar, or network, etc.). Various exemplary software embodiments may be described in terms of this exemplary computer system. After reading this description, it will become apparent to a person skilled in the relevant art(s) how to implement the invention using other computer systems and/or architectures.

Computer system 400 may include a display interface 402 that may forward, e.g., but not limited to, graphics, text, and other data, etc., from the communication infrastructure 406 (or from a frame buffer, etc., not shown) for display on the display unit 430.

The computer system 400 may also include, e.g., but may not be limited to, a main memory 408, random access memory (RAM), and/or a secondary memory 410, etc. The secondary memory 410 may include, for example, (but not limited to) a hard disk drive 412, flash memory, a storage device, and/or a removable storage drive 414, representing a floppy diskette drive, a magnetic tape drive, an optical disk drive, a compact disk drive CD-ROM, etc. The removable storage drive 414 may, e.g., but not limited to, read from and/or write to a removable storage unit 418 in a well known manner. Removable storage unit 418, also called a program storage device or a computer program product, may represent, e.g., but not limited to, a floppy disk, magnetic tape, optical disk, compact disk, etc. which may be read from and written to by removable storage drive 414. As will be appreciated, the removable storage unit 418 may include a computer usable storage medium having stored therein computer software and/or data.

In alternative exemplary embodiments, secondary memory 410 may include other similar devices for allowing computer programs or other instructions to be loaded into computer system 400. Such devices may include, for example, a removable storage unit 422 and an interface 420. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units 422 and interfaces 420, which may allow software and data to be transferred from the removable storage unit 422 to computer system 400.

Computer 400 may also include an input device such as, e.g., (but not limited to) a mouse or other pointing device such as a digitizer, and a keyboard or other data entry device (none of which are labeled).

Computer 400 may also include output devices, such as, e.g., (but not limited to) display 430, and display interface 402. Computer 400 may include input/output (I/O) devices such as, e.g., (but not limited to) communications interface 424, cable 428 and communications path 426, etc. These devices may include, e.g., but not limited to, a network interface card, and modems (neither are labeled). Communications interface 424 may allow software and data to be transferred between computer system 400 and external devices. Examples of communications interface 424 may include, e.g., but may not be limited to, a modem, a network interface (such as, e.g., an Ethernet card), a communications port, a Personal Computer Memory Card International Association (PCMCIA) slot and card, etc. Software and data transferred via communications interface 424 may be in the form of signals 428 which may be electronic, electromagnetic, optical or other signals capable of being received by communications interface 424. These signals 428 may be provided to communications interface 424 via, e.g., but not limited to, a communications path 426 (e.g., but not limited to, a channel). This channel 426 may carry signals 428, which may include, e.g., but not limited to, propagated signals, and may be implemented using, e.g., but not limited to, wire or cable, fiber optics, a telephone line, a cellular link, an radio frequency (RF) link and other communications channels, etc.

In this document, the terms "computer program medium" and "computer readable medium" may be used to generally refer to media such as, e.g., but not limited to removable storage drive 414, a hard disk installed in hard disk drive 412, and signals 428, etc. These computer program products may provide software to computer system 400. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device, and/or a special purpose device programmed according to various algorithms and/or flowcharts and processes/methods as described at length herein.

Embodiments of the invention may be implemented in one or a combination of hardware, firmware, and software. Embodiments of the invention may also be implemented as instructions stored on a machine-readable medium, which may be read and executed by a computing platform, which may include one or more processors, such as, e.g., but not limited to, a microprocessor, a multi-core processor, a quad-core processor, a central processing unit (CPU), a quantum computer, a nanoprocessor, a computational engine, an information appliance, a virtual processor, a co-processor, a busmaster processor, a graphics processor (GPU), a digital signal processor (DSP), controller, microcontroller, system on a chip (SOC), cluster, and/or other processor, to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical, magneto-optical, SD-RAM, SDCard, and/or other form of non-transitory medium storing any propagated signals (e.g., carrier waves, infrared signals, digital signals, etc.), and others.

Computer programs (also called computer control logic), may include object oriented computer programs, and may be stored in main memory 408 and/or the secondary memory 410 and/or removable storage units 414, also called computer program products. Such computer programs, when executed, may enable the computer system 400 to perform the features of the present invention as discussed herein. In particular, the computer programs, when executed, may enable the processor 404 to provide a method to resolve conflicts during data synchronization according to an exemplary embodiment of the present invention. Accordingly, such computer programs may represent controllers of the computer system 400.

In another exemplary embodiment, the invention may be directed to a computer program product comprising a computer readable medium having control logic (computer software) stored therein. The control logic, when executed by the processor 404, may cause the processor 404 to perform the functions of the invention as described herein. In another exemplary embodiment where the invention may be implemented using software, the software may be stored in a computer program product and loaded into computer system 400 using, e.g., but not limited to, removable storage drive 414, hard drive 412 or communications interface 424, etc. The control logic (software), when executed by the processor 404, may cause the processor 404 to perform the functions of the invention as described herein. The computer software may run as a standalone software application program running atop an operating system, or may be integrated into the operating system.

In yet another embodiment, the invention may be implemented primarily in hardware using, for example, but not limited to, hardware components such as application specific integrated circuits (ASICs), or one or more state machines, etc. Implementation of the hardware state machine so as to perform the functions described herein will be apparent to persons skilled in the relevant art(s).

In another exemplary embodiment, the invention may be implemented primarily in firmware.

In yet another exemplary embodiment, the invention may be implemented using a combination of any of, e.g., but not limited to, hardware, firmware, and software, etc.

Exemplary embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or nontransitory versions of other forms of previously propagated signals (e.g., carrier waves, infrared signals, digital signals, etc.), and others.

Still referring to FIG. 4, a universal integrated circuit card (UICC) (not shown) comprising a subscriber identity module and possibly a secure storage and/or cryptoprocessor can also coupled to the application or system processor. The system may further include a security processor (not shown) that may couple to the application or system processor or CPU.

One or more, or a plurality of sensors may couple to processor, or application processor to enable input of a variety of sensed information such as accelerometer and other environmental information. An audio, and/or video, output device may provide an interface to output sound, and/or other data, e.g., in the form of voice communications, played or streaming audio data and so forth.

As further illustration of FIG. 4, an exemplary near field communication (NFC) contactless interface can be provided in certain embodiments, that can communicate in a NFC near field via an NFC antenna, for example (not shown). While separate antennae can be used, not all are shown in FIG. 4 for simplicity of illustration, but will be apparent to those skilled in the relevant art, understand that in some implementations can include one or more antenna(ae) or a different set of antennae may be provided to enable various wireless functionality.

Further, an exemplary power management integrated circuit (PMIC) can couple to application processor or system processor, to perform platform level power management. To this end, PMIC (not shown) may issue power management requests to application processor, system processor, etc., to enter certain low power states as desired. Furthermore, based on platform constraints, PMIC may also control the power level of other components of the exemplary system as shown in FIG. 4.

To enable communications to be transmitted and received, various circuitry may be coupled between an exemplary baseband or other system processor and/or an antenna (not necessarily shown in the block diagram). Specifically, a radio frequency (RF) transceiver and/or a wireless local area network (WLAN) transceiver, and/or a network interface card (NIC) may be present, in certain exemplary embodiments. In general, RF transceivers may be used to receive and transmit wireless data and calls according to a given wireless communication protocol such as, e.g., but not limited to, 3G, 4G, 5G, nG, next generation (NG), etc. wireless communication protocol such as in accordance with a code division multiple access (CDMA), global system for mobile communication (GSM), long term evolution (LTE) or other protocol. In addition a GPS sensor may be present in certain embodiments (not necessarily shown in block diagram). Other wireless and/or wired communications such as, e.g., but not limited to, receipt or transmission of radio signals, e.g., AM/FM, Wi-Fi, WiMAX, etc., and other signals may also be provided, on a local area, and/or a wide area basis. In addition, via an exemplary WLAN transceiver, local wireless communications can also be realized.

Further referring to FIG. 4, shown is a block diagram of another example system with which embodiments may be used. In the illustration of exemplary systems herein, some communications devices may be mobile, and/or portable, and/or, low-power system(s) such as, e.g., but not limited to, a tablet computer, 2:1 tablet, phablet, a smartphone, a laptop, a notebook, a portable computer, a personal computer, a telephony device, a cellphone, an ultrabook, a GOOGLE CHROME book, etc, a thick client, a fat client, a thin client, and/or convertible and/or standalone, and/or desktop and/or tablet system. As illustrated, a system on a chip (SoC) can also be used and may be configured to operate as a system processor, and/or an application processor for the device.

A variety of devices may couple to an exemplary SoC. In the illustration shown, a memory subsystem may include an exemplary flash memory and/or a DRAM coupled to a SoC, and/or processor and/or controller, and/or microcontroller. In addition, a touch panel 1320 is coupled to the SoC, etc. to provide display capability and/or user input via exemplary touch and/or other interface, including, e.g., but not limited to, provision of an actual, and/or virtual keyboard, and/or other input device, which can be alternatively displayed on an exemplary display of an exemplary touch enabled display panel monitor, or other output device or screen, according to exemplary embodiments.

To provide wired network connectivity, SoC or system processor can couple to an exemplary network interface such as, e.g., but not limited to, an exemplary Ethernet interface. A peripheral hub can be coupled to SoC or system processor, in some embodiments, to enable interfacing with various peripheral devices, such as may be coupled to system by any of various ports and/or other connectors. Various other output devices can include any of various indicators such as, e.g., but not limited to, display interfaces, LEDs, LCDs, etc., interfaces, command line interfaces, graphical user interfaces, etc.

In addition to internal power management circuitry and functionality optionally provided in some embodiments, within SoC or system processor, or a PMIC can be coupled to exemplary SoC or system processor embodiments to provide exemplary platform-based power management, e.g., based on whether the system is powered by a battery, or AC power, via an AC adapter, and/or uninterruptible power supply or other power source, in an exemplary embodiment. In addition to this power source-based power management, PMIC may further perform platform power management activities based on environmental and usage conditions in some embodiments. Still further, PMIC may communicate control and status information to SoC or system processor or controller to cause various power management actions within SoC or system processor, in exemplary embodiments.

Still referring to FIG. 4, to provide for exemplary communication functions, such as, e.g., but not limited to, wired capabilities, and/or wireless capabilities, a communication interface, such as, e.g., a WLAN unit can be coupled to SoC or system processor and/or in turn to an exemplary antenna. In various implementations, WLAN unit or other communications devices may provide for communication according to one or more wireless and/or wired communications protocols, as described herein, and as would be apparent to those skilled in the relevant art.

As further describing FIG. 4 in illustrative embodiments, a plurality of sensors (not shown) may couple to SoC and/or the system processor. These sensor(s) may include various accelerometer, environmental and other sensors, including, e.g., but not limited to, user gesture sensors, range finders, location based sensors, gyroscopic, touch, ultrasonic, and/or other well known sensors. Finally, an audio codec, and/or an analog to digital converter, and/or digital to analog converter, can be coupled to SoC or system processor to provide an interface to an exemplary audio input and/or output device. Of course, as will be understood to those skilled in the relevant art, such examples are intended merely as way of example, but not limitation, and that whether shown or not shown, discussed, or not discussed, are intended still to potentially fall with this particular implementations as described in the exemplary figures including FIG. 4, however many variations and alternatives are possible within the scope of the claims as set forth below.

The exemplary embodiment of the present invention makes reference to wired, or wireless networks. Wired networks include any of a wide variety of well known means for coupling voice and data communications devices together. A brief discussion of various exemplary wireless network technologies that may be used to implement the embodiments of the present invention now are discussed. The examples are non-limited. Exemplary wireless network types may include, e.g., but not limited to, code division multiple access (CDMA), spread spectrum wireless, orthogonal frequency division multiplexing (OFDM), 1G, 2G, 3G, 4G, 5G, 6G, n-G (any future wireless standard), next generation (NG), wireless, Bluetooth, Infrared Data Association (IrDA), shared wireless access protocol (SWAP), "wireless fidelity" (Wi-Fi), WIMAX, and other IEEE standard 802.11-compliant wireless local area network (LAN), 802.16-compliant wide area network (WAN), and ultrawideband (UWB), etc.

Bluetooth is a wireless technology promising to unify several wireless technologies for use in low power radio frequency (RF) networks.

IrDA is a standard method for devices to communicate using infrared light pulses, as promulgated by the Infrared Data Association from which the standard gets its name. Since IrDA devices use infrared light, they may depend on being in line of sight with each other.

The exemplary embodiments of the present invention may make reference to WLANs. Examples of a WLAN may include a shared wireless access protocol (SWAP) developed by Home radio frequency (HomeRF), and wireless fidelity (Wi-Fi), a derivative of IEEE 802.11, advocated by the wireless Ethernet compatibility alliance (WECA). The IEEE 802.11 wireless LAN standard refers to various technologies that adhere to one or more of various wireless LAN standards. An IEEE 802.11 compliant wireless LAN may comply with any of one or more of the various IEEE 802.11 wireless LAN standards including, e.g., but not limited to, wireless LANs compliant with IEEE std. 802.11a, b, d, g, n, etc. such as, e.g., but not limited to, IEEE std. 802.11 a, b, d, g, n, (including, e.g., but not limited to IEEE 802.11g-2003, etc.), IEEE 802.16, Wi-MAX, etc.

Wide area networks (WANs) allow extending of computer networks over large distances, connecting or coupling remote branch offices to data centers and to other branch offices, and delivery of applications and services required to perform business functions. When entities like companies or government agencies extend networks over greater distances and sometimes across multiple carriers' networks, the entities can face operational challenges including, e.g., but not limited to, latency, network congestion, jitter, packet loss, and/or even service outages, etc. Modern communications related applications such as, e.g., but not limited to, voice over internet protocol (VoIP) calling, videoconferencing, streaming media, and/or virtualized applications and/or desktops, etc., can require low latency. Bandwidth requirements are also continually increasing, especially for applications featuring high-definition video, and the like. Expanding WAN capability can be expensive and difficult with corresponding difficulties related to network management and troubleshooting.

SD-WAN or SDWAN is an acronym for software-defined networking in a WAN. An SD-WAN simplifies the management and operation of a WAN by decoupling or separating networking hardware from a network control mechanism. SDWAN is similar to how software-defined networking implements virtualization technology to improve data center management and operation. SD-WAN enables building higher-performance WANs using lower-cost and commercially available Internet access, enabling businesses to partially or wholly replace more expensive private WAN connection technologies such as multiprotocol label switching (MPLS).

SDWAN can include redundant telecommunications links, combined with central management of those links with a focus on application delivery across the WAN, and adding dynamic sharing of network bandwidth across connection points, use of central controllers, integrated analytics, on-demand circuit provisioning, network intelligence, centralized policy management and security. SDWAN can include support for multiple connection types such as, e.g., but not limited to, MPLS, frame relay, high speed wireless communications, LTE communications, etc., dynamic path selection, load sharing, resiliency support, configurability, quality of service (QoS) support, flexible deployment, simplified administration, troubleshooting, and/or manageability via, e.g., but not limited to, a software based easy to use interface, such as, e.g., but not limited to, a graphical user interface (GUI), preferably to command line (CLI) interface methods of configuration and control, support for virtual private networks (VPNs) and third party services such as, e.g., but not limited to, WAN optimization controllers, firewalls, and/or web gateways, etc. SDWAN products can be physical appliances, software based, or some combination thereof. SDWAN can support quality of service via application level awareness, bandwidth prioritization, and allocation and prioritization to critical applications, dynamic path selection, allocating applications on faster links, splitting applications between multiple paths for increased performance, faster data delivery, etc. Improved performance of SDWANs can include caching and storage based technologies allowing faster access to recently accessed information by placement in memory to speed future access. SDWANs can include preconfigured appliances, virtual appliances, cloud-based appliances, and can enable migration from corporate networks to cloud based services and the like.

SDWAN products are designed to address these WAN network problems. By enhancing or even replacing traditional branch routers with virtualization appliances that can control application-level policies and offer network overlay, less expensive consumer-grade Internet links can act more like a conventional dedicated telecommunications circuit. The use of these virtualization appliances in SDWANs can simplify setup for branch or remote personnel. SDWAN products can be physical appliances or virtual appliances, and can be placed in, e.g., but not limited to, small remote and branch offices, larger offices, corporate data centers, and/or increasingly on cloud platforms, etc.

A centralized controller is used to set policies and prioritize traffic. The SD-WAN takes into account these policies and the availability of network bandwidth to route traffic. This helps ensure that application performance meets service level agreements (SLAs).

Embodiments of the inventions may be implemented in code and may be stored on an exemplary non-transitory computer accessible storage medium having stored thereon instructions which can be used to program a system to perform the instructions. Embodiments also may be implemented in data and may be stored on a non-transitory storage medium, which if used by at least one machine, can cause the at least one machine to fabricate and/or create at least one integrated circuit and/or special purpose processors including application specific integrated circuits (ASICs), digital signal processors (DSPs), programmable logic devices (PLDs), digital signal processing devices (DSPDs), field programmable gate arrays (FPGAs), processors, microprocessors, quantum computers, clusters, multi-processor systems, etc., controllers, and/or microcontrollers, and/or systems on a chip (SoC), to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, digital versatile disks (DVD), BLUERAY high definition video disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, and/or magneto-optical devices, or any other type of media suitable for storing electronic instructions.

CONCLUSION

Although the invention is described in terms of these example environments, it is important to note that description in these terms is provided for purposes of illustration only. It is not intended that the invention be limited to these example environments or to the precise inter-operations between the above-noted entities and devices. In fact, after reading the following description, it will become apparent to a person skilled in the relevant art how to implement the invention in alternative environments.

What is claimed is:

1. A system of transmitting and receiving audio frequency signals comprising PSTN-compatible, or voice over IP (VoIP) signals, or high definition voice signals over a packet data network wherein the packet data network comprises a software defined wide area network (SDWAN), the system comprising:

a first system comprising:
  at least one first memory device; and
  at least one first processor, coupled to said at least one first memory device and the packet data network, said at least one first processor comprising at least one or more of:
    at least one application-specific integrated circuit (ASIC),
    at least one chipset,
    at least one processor,
    at least one microprocessor,
    at least one logic circuit,
    at least one quantum computer,
    at least one multi-core processor,
    at least one quad core processor,
    at least one programmable logic device (PLD),
    at least one field programmable gate arrays (FPGA),
    at least one information appliance,
    at least one system on a chip (SOC),
    at least one multi-processor,
    at least one computer processor,
    at least one graphics processor, or
    at least one digital signal processor (DSP),
  said at least one first processor configured to:
    receive one or more first incoming audio frequency signals;
    digitize said one or more first incoming audio frequency signals according to an audio standard to obtain first digitized audio frequency signals;
    segment said first digitized audio frequency signals to generate one or more first sequences of audio signal samples, each of said one or more first sequences of audio signal samples comprising a first preprogrammed sample size;
    compress said each of said one or more first sequences of audio signal samples according to a first preprogrammed set of rules comprising a first preprogrammed compression algorithm, to produce a first sequence of one or more strings of processed samples, responsive to determining that said each of said one or more first sequences of audio signal samples is determined to meet a first preprogrammed criteria for compression according to said first preprogrammed set of rules;
    accumulate said first sequence of said one or more strings of processed samples to create a first group of samples ready for transmission according to a first aggregation threshold defined by a second preprogrammed set of rules,
    create a first outgoing digital message from said first group of samples ready for transmission according to a forwarding threshold defined by a third preprogrammed set of rules, using at least one of:
      a first pre-defined data link protocol, or
      a first control channel;
    transmit said first outgoing digital message over the software defined wide area network (SDWAN) to a second system;
    receive, from the software defined wide area network, and interpret, a first incoming digital message from the second system;
    process said first incoming digital message into one or more incoming digital audio stream samples according to said third pre-programmed set of rules comprising said first pre-defined data link protocol, or said first control channel, or a second pre-defined data link protocol, or a second control channel; and accumulate and process said one or more incoming digital audio stream samples according to a fourth preprogrammed set of rules comprising being configured to:
  decompress any compressed of said one or more incoming digital audio stream samples according to a first preprogrammed decompression algorithm defined by said fourth preprogrammed set of rules into decompressed digital audio samples;
  accumulate said first decompressed digital samples into a first buffer according to a first jitter buffer threshold, wherein said first jitter buffer threshold is defined by said fourth preprogrammed set of rules; and
  regenerate first outgoing audio frequency signals based on said first decompressed digital audio samples.

2. The system of claim 1, further comprising at least one or more of:
  wherein the software defined wide area network comprises an Internet protocol (IP) based network; or
  wherein the software defined wide area network comprises an LTE software defined wide area network; or
  an interface to a voice over Internet protocol (VoIP) packet system or a High Definition Voice system.

3. The system of claim 1, further comprising:
  the second system coupled to said first system, said second system comprising:
    at least one second memory device; and
    at least one second processor, coupled to said at least one second memory device, said at least one second processor comprising at least one or more of:
      at least one application-specific integrated circuit (ASIC),
      at least one chipset,
      at least one processor,
      at least one microprocessor,
      at least one logic circuit,
      at least one quantum computer,
      at least one multi-core processor,
      at least one quad core processor,
      at least one programmable logic device (PLD),
      at least one field programmable gate arrays (FPGA),
      at least one information appliance,
      at least one system on a chip (SOC),
      at least one multi-processor,
      at least one computer processor,
      at least one graphics processor, or
      at least one digital signal processor,
  said at least one second processor configured to
    receive one or more second incoming audio frequency signals;
    digitize said one or more second incoming audio frequency signals according to an audio standard to obtain second digitized audio frequency signals;
    segment said second digitized audio frequency signals to generate one or more second sequences of audio signal samples, each of said one or more second sequences of said audio signal samples comprising said first preprogrammed sample size or a second preprogrammed sample size;
    compress said each of said one or more second sequences of audio signal samples according to said first preprogrammed set of rules or a fifth preprogrammed set of rules comprising said first preprogrammed compression algorithm or a second preprogrammed compression algorithm, to produce a second sequence of one or more strings of processed samples, responsive to determining that said each of said one or more second sequences of audio signal samples is determined to meet said first preprogrammed criteria, or a second preprogrammed criteria for compression according to said first or said fifth preprogrammed set of rules;
    accumulate said second sequence of said one or more strings of processed samples to create a second group of samples ready for transmission according to said first aggregation threshold, or a second aggregation threshold defined by a sixth preprogrammed set of rules;
    create a second outgoing digital message from said second group of samples ready for transmission according to said forwarding threshold, or a second forwarding threshold defined by a seventh preprogrammed set of rules, wherein said second outgoing digital message for transmission is created using said first or said second pre-defined data link protocol, or said first or said second control channel, or a third pre-defined data link protocol, or a third control channel;
    transmit said second outgoing digital message over the software defined wide area network to said first system;
    receive at the second system from the software defined wide area network, and interpret, a second incoming digital message from said first system; and
    process said second incoming digital message into one or more second incoming digital audio stream samples according to said third preprogrammed set of rules or an eighth preprogrammed set of rules comprising said first, said second, or said third pre-defined data link protocol, or said first, said second, or said third control channel, or a fourth pre-defined data link protocol or a fourth control channel;
    accumulate and process said one or more second incoming digital audio stream samples according to said fourth preprogrammed set of rules, or a ninth preprogrammed set of rules;
    decompress said one or more of said second incoming digital audio sample streams according to a second pre-programmed decompression algorithm as defined by said fourth or said ninth pre-programmed set of rules into second decompressed digital audio samples;
    accumulate said second decompressed digital audio samples into a second buffer according to a second jitter buffer threshold, wherein said second jitter buffer threshold is defined by said fourth or said ninth pre-programmed set of rules; and
    regenerate second outgoing audio frequency signals based on said second decompressed digital audio samples.

4. The system of claim 3, wherein said first system and the second system are located at least one of:
  at a single location, or
  at different locations.

5. The system of claim 3, wherein the system is configured to use at least one of:
  predetermined information, or
  learned information, or
  preconfigured information,
to determine at least one of said first, said second, said third, or said fourth preprogrammed rules to apply to process said first or said second signal information and forward messages between said first and the second systems.

6. The system of claim 3, wherein said ninth preprogrammed set of rules comprises configuring the system to at least one of any one or more of:

define a size of said second jitter buffer; or
define a size of said second jitter buffer on a call by call basis; or
define a size of said jitter buffer based on at least one of any one or more of:
 a predetermined criteria, or
 a fixed criteria, or
 dynamically collected operational data,
  wherein said dynamically collected operational data comprises at least one or more of:
   current network jitter, or
   current network delay, or
   current network loading, or
   packet loss, or
   network data errors, or
   time of day, or
   QoS requirements, or
   other relevant collected data
  wherein said dynamically collected operational data comprises being
   configured to be at least one of any one or more of:
    collected locally, or
    sourced from externally connected equipment comprising at least
    one of any one or more of:
     a router, or
     a SDWAN device, or
     a SDWAN controller, or
     performance monitoring equipment.

7. The system of claim 1, wherein the system further comprises wherein at least one of: said first system, or the second system, is configured to at least one of:
 compress, or
 decompress, at least one of:
  PSTN, or
  VoIP, or
  High Definition Voice,
 compatible audio signals.

8. The system of claim 1, comprising:
 wherein said first control channel comprises at least one of:
  an in-band control channel, or
  an out-of-band control channel, and
 wherein said first control channel is configured to:
  remotely manage and provide a mechanism to pass control information for synchronization between, said first and the second systems,
  wherein said mechanism is configured to pass said control information at least one of:
   during initialization, or
   during routing changes, or
   to enable changes in size of jitter buffers, or
   to turn compression on or off during a call, and
  provide communications to perform at least one of:
   facilitate transportation of a plurality of strings of said processed samples with a single string of digital messages; or
   provide monitoring function; or
   provide a control function; or
   determine real time diagnostic information; or
   determine status information; or
   determine ancillary information.

9. The system according to claim 1, wherein said at least one first, second, third, or fourth preprogrammed set of rules comprises at least one of:

a) at least one intelligent, dynamic, or buffered preprogrammed rule based on positive feedback or collected information; or
b) at least one preprogrammed rule dependent upon a type of the software defined wide area network over which the audio frequency signals are transmitted; or
c) wherein said at least one of said at least one first, second, third, or fourth preprogrammed rule is configured to at least one of:
 regenerate as accurately as possible, the audio frequency signals, or
 reproduce a channel regardless of content transported, while said at least one first, second, third, or fourth preprogrammed rule maintains integrity of the audio frequency signals; or
d) wherein determining whether voice over IP (VoIP) or High Definition Voice packets are received, either segmenting and compressing first, or responsive to determining that said packets are already compressed, then proceeding to accumulating audio signal samples, and combining and creating an aggregated digital message for transmitting; or
e) wherein determining whether receiving and interpreting a second incoming digital message at the second system from said first system, processing to isolate a second incoming digital audio stream, and responsive to determining that the second incoming digital audio stream is going to a VoIP system or a High Definition Voice system, and then processing digital samples of said incoming digital message and outputting packets containing digital audio stream information, and responsive to determining that the second incoming digital audio stream is determined not to be going to said VoIP system or said High Definition Voice system, then first processing samples of the incoming digital messages including decompressing responsive to determining that decompression is required, accumulating processed samples in a jitter buffer, and regenerating a second outgoing audio signal; or
f) setting an aggregation threshold and a forwarding threshold, receiving a third incoming digital audio signal, segmenting the third incoming digital audio signal into a segmented audio signal sample, compressing the segmented audio signal sample into a compressed audio signal sample, buffering in an aggregation buffer the compressed audio signal sample, and
 determining whether the aggregation threshold is met, and responsive to the aggregation threshold being determined not met then
  determining whether the incoming signal end has been reached and
   responsive to determining that the incoming signal end is determined to be reached then ending, or
   responsive to determining that the end of the incoming signal has not been reached then updating the aggregation threshold, and
 responsive to determining that the aggregation threshold is determined to be met then
  forwarding samples for transmission,
  merging samples from multiple audio streams into a group of merged samples, and preparing for transmission of the group of merged samples, and then
  determining whether the forwarding threshold is met, and
   responsive to determining that the forwarding threshold is determined to be met, then
    first setting a next forwarding threshold, creating a digital message, and
transmitting the digital message from said first system to the second system over the software defined wide area network; or
responsive to determining that the forwarding threshold is determined to not have been met then proceeding immediately; and
updating the forwarding threshold.

10. The system according to claim 1,
wherein said first system configured to segment comprises being configured to:
reassemble and resegment said first digitized incoming audio frequency signals, responsive to determining that a sample size is different from a desired sample size.

11. The system according to claim 1,
wherein said first preprogrammed rules comprises being configured to:
compress, using said first preprogrammed compression algorithm, any of said each of said one or more first sequences of said audio signal samples responsive to determining that said first preprogrammed criteria for compression according to said first preprogrammed set of rules determines it is desired to compress said any of said each of said one or more first sequences of said audio signal samples; and
not compress any of said each of said one or more first sequences of audio signal samples, according to said first preprogrammed set of rules, responsive to determining that said first preprogrammed criteria for compression according to said first preprogrammed set of rules determines it is not desired to compress said any of said each of said one or more first sequences of said audio signal samples,
wherein said first preprogrammed criteria for compression according to said first preprogrammed set of rules comprises being configured to determine desirability of compression or noncompression is based on any one or more of:
responsive to determining that the audio is determined to have already been compressed; or
fewer than a predefined number of calls are determined to be currently in progress; or
responsive to determining that the call is from a wireless phone; or
responsive to determining that the call is international; or
responsive to determining that the call is between certain times of the day; or
responsive to determining that the call is an emergency call; or
responsive to determining that the call is an otherwise prioritized call; or
responsive to determining that the call is a facsimile call; or
responsive to determining that the call is a data modem call; or
responsive to determining that the call meets other preprogrammed criteria; or
responsive to determining that predetermined characteristics of the network are operating within certain performance limits comprising any one or more of the following:
network loading; or
network delay; or
network jitter; or
network data errors; or
packet loss; or
responsive to determining that characteristics measured in real time of the network are operating within certain performance limits comprising any one or more of:
network loading; or
network delay; or
network jitter; or
network data errors; or
packet loss; or
other relevant collected data.

12. The system according to claim 1,
wherein said second preprogrammed set of rules comprises being configured to:
define said first aggregation threshold that determines when a said first group of outgoing samples is ready for transmission; and
wherein said first aggregation threshold comprises being configured to be at least one of any one or more of:
fixed; or
variable, based on a plurality of factors, wherein said plurality of factors comprises at least one of any one or more of:
a number of outgoing samples ready for transmission; or
an amount of data that may be transmitted in a next packet; or
a maximum packet size; or
a timer; or
a number of calls in progress; or
a priority of certain call types; or
other relevant operational data.

13. The system according to claim 1,
wherein said third preprogrammed set of rules comprises being configured to any one or more of:
merge to create one or more packets of data for transmission; or
define an order of priority, responsive to determining that multiple packets are to be transmitted; or
define frequency of when packets are to be sent; or
define a time at which packets are to be sent; or
define size of packets; or
adjust the forwarding threshold based upon at least one of any one or more of:
taking into account real time factors comprising any one or more of:
current network operating characteristics comprising at least one of any one or more of:
loading; or
delay; or
jitter; or
packet loss; or
data errors; or
availability of alternative routing; or
availability of additional bandwidth on demand; or
number of calls in progress; or
time of day; or
emergency network loading; or
other network loading; or
other relevant operational data; or
Quality of Service (QoS) requirements; or
Prioritization.

14. The system according to claim 1,
wherein said accumulate said first sequence of said one or more strings of processed samples to create said first group of samples ready for transmission according to said first aggregation threshold defined by said second preprogrammed set of rules, comprises wherein said first system comprises an aggregation buffer.

15. The system according to claim 1, wherein said the software defined wide area network comprises a communications network comprising:
   at least one wireless network; or
   at least one wired; or
   at least one satellite network; or
   at least one optical network.

16. The system according to claim 1, comprising:
   wherein said first system configured to create comprises using said first control channel, and further comprising wherein said first system is configured to:
      establish said first control channel between said first system, and said second system, in advance of processing said one or more first incoming audio frequency signals, comprising wherein said first system is configured to:
         set up at least one voice trunk as soon as said first system and said second system are switched on, wherein said first control channel is ready when a first call is made, providing for faster call connect, and greater efficiency than absent said establishing.

17. The system according to claim 1, comprising:
   wherein said first system configured to create comprises using said first control channel, and further comprising wherein said first system is configured to:
      wait for receipt of a first call, and
      upon said receipt of said first call,
         establish said first control channel between said first system, and said second system, based on real time call requirements of said first call, to allow processing said one or more first incoming audio frequency signals; and
            wherein said first system is configured to comprise:
               wherein said first control channel comprises, depending on preprogrammed criteria, to either one of:
                  become permanently established; or
                  become temporarily established.

18. The system according to claim 1, further comprising wherein said first system and said second system are configured to:
   connect or couple said first system and said second system simultaneously to one another, creating a mesh network.

19. The system according to claim 1, wherein the packet data network comprises any one or more of:
   a wired network;
   a wireless network;
   an optical network;
   a fiber network;
   a satellite network;
   a 4G wireless network;
   a 5G wireless network;
   a 6G wireless network;
   an n-G wireless network;
   a Long-Term Evolution (LTE) network;
   a wireless LTE network;
   a GSM/EDGE network;
   a UMTS/HSPA network;
   a CDMA2000 network;
   a 4G LTE network;
   a 3G or 3GPP network;
   a WiMAX network;
   an evolved high speed packet access network;
   an LTE Advanced network;
   a WiMAX-Advanced network;
   a True 4G network;
   an IMT-Advanced network;
   an LTE Time-Division Duplex (LTE-TDD) network;
   an LTE Frequency-Division Duplex (LTE-FDD) network;
   a Voice over LTE (VoLTE) network;
   a Circuit-switched fallback (CSFB) network;
   a Simultaneous voice and LTE (SVLTE) network; or
   a Single Radio Voice Call Continuity (SRVCC) network.

20. A method of transmitting and receiving audio frequency signals comprising PSTN-compatible, or voice over IP (VoIP) signals, or high definition voice signals over a packet data network wherein the packet data network comprises a software defined wide area network (SDWAN), the method comprising:
   receiving, by at least one processor of a first system, one or more first incoming audio frequency signals,
   wherein said at least one processor of said first system comprises at least one or more of:
      at least one application-specific integrated circuit (ASIC),
      at least one chipset,
      at least one processor,
      at least one microprocessor,
      at least one logic circuit,
      at least one quantum computer,
      at least one multi-core processor,
      at least one quad core processor,
      at least one programmable logic device (PLD),
      at least one field programmable gate arrays (FPGA),
      at least one information appliance,
      at least one system on a chip (SOC),
      at least one multi-processor,
      at least one computer processor,
      at least one graphics processor, or
      at least one digital signal processor (DSP),
   said at least one first processor;
   digitizing, by said at least one processor of said first system, said one or more first incoming audio frequency signals according to an audio standard obtaining first digitized audio frequency signals;
   segmenting, by said at least one processor of said first system, said first digitized audio frequency signals to generate one or more first sequences of audio signal samples, each of said one or more first sequences of audio signal samples comprising a first preprogrammed sample size;
   compressing, by said at least one processor of said first system, said each of said one or more first sequences of audio signal samples according to a first preprogrammed set of rules comprising using a first preprogrammed compression algorithm, producing a first sequence of one or more strings of processed samples, responsive to determining that said each of said one or more first sequences of audio signal samples is determined to meet a first preprogrammed criteria for compression according to said first preprogrammed set of rules;
   accumulating, by said at least one processor of said first system, said first sequence of said one or more strings of processed samples creating a first group of samples ready for transmission according to a first aggregation threshold defined by a second preprogrammed set of rules;

creating a first outgoing digital message from said first group of samples ready for transmission according to a forwarding threshold defined by a third preprogrammed set of rules, using at least one of:
  a first pre-defined data link protocol, or
  a first control channel;
transmitting, by said at least one processor of said first system, said first outgoing digital message over the software defined wide area network to a second system;
receiving, by said at least one processor of said first system, from the software defined wide area network, and interpreting, by said at least one processor of said first system, a first incoming digital message from the second system;
processing, by said at least one processor of said first system, said first incoming digital message into one or more incoming digital audio stream samples according to said third pre-programmed set of rules comprising said first pre-defined data link protocol, or said first control channel, or a second pre-defined data link protocol, or a second control channel; and
accumulating and processing said one or more incoming digital audio stream samples according to a fourth preprogrammed set of rules comprising being configured to:
  decompressing any compressed of said one or more incoming digital audio stream samples according to a first preprogrammed decompression algorithm defined by said fourth preprogrammed set of rules into decompressed digital audio samples;
  accumulating said first decompressed digital samples into a first buffer according to a first jitter buffer threshold, wherein said first jitter buffer threshold is defined by said fourth preprogrammed set of rules; and
  regenerating, by said at least one processor of said first system, first outgoing audio frequency signals based on said first decompressed digital audio samples.

21. The method of claim 20, further comprising at least one or more of:
  wherein the software defined wide area network comprises an Internet protocol (IP) based network; or
  wherein the software defined wide area network comprises a LTE software defined wide area network; or
  providing, by said at least one processor of said first system, an interface to a voice over Internet protocol (VoIP) packet system or High Definition Voice system.

22. The method of claim 20, further comprising:
receiving, by at least one processor of the second system, one or more second incoming audio frequency signals, wherein said at least one processor of the second system comprises at least one or more of:
  at least one application-specific integrated circuit (ASIC),
  at least one chipset,
  at least one processor,
  at least one microprocessor,
  at least one logic circuit,
  at least one quantum computer,
  at least one multi-core processor,
  at least one quad core processor,
  at least one programmable logic device (PLD),
  at least one field programmable gate arrays (FPGA),
  at least one information appliance,
  at least one system on a chip (SOC),
  at least one multi-processor,
  at least one computer processor,
  at least one graphics processor, or
  at least one digital signal processor;
digitizing, by said at least one processor of the second system, said one or more second incoming audio frequency signals according to an audio standard obtaining second digitized audio frequency signals;
segmenting, by said at least one processor of the second system, said second digitized audio frequency signals generating one or more second sequences of audio signal samples, each of said one or more second sequences of said audio signal samples comprising said first preprogrammed sample size or a second preprogrammed sample size;
compressing said each of said one or more second sequences of audio signal samples according to said first preprogrammed set of rules or a fifth preprogrammed set of rules comprising said first preprogrammed compression algorithm or a second preprogrammed compression algorithm, producing a second sequence of one or more strings of processed samples, responsive to determining that said each of said one or more second sequences of audio signal samples is determined to meet said first or a second preprogrammed criteria for compression according to said first or said fifth preprogrammed set of rules;
accumulating, by said at least one processor of the second system, said second sequence of said one or more strings of processed samples, creating a second group of samples ready for transmission according to said first aggregation threshold, or a second aggregation threshold defined by a sixth preprogrammed set of rules;
creating a second outgoing digital message from said second group of samples ready for transmission according to said forwarding threshold, or a second forwarding threshold defined by a seventh preprogrammed set of rules, wherein said second outgoing digital message for transmission is created using said first or said second pre-defined data link protocol, or said first or said second control channel, or a third pre-defined data link protocol, or a third control channel;
transmitting, by said at least one processor of the second system, said second outgoing digital message over the software defined wide area network to said first system;
receiving, by said at least one processor of the second system, at the second system from the software defined wide area network, and interpreting, by said at least one processor of the second system, a second incoming digital message from said first system; and
processing, by said at least one processor of the second system, said second incoming digital message into one or more second incoming digital audio stream samples according to said third preprogrammed set of rules or an eighth preprogrammed set of rules comprising said first, said second, or said third pre-defined data link protocol, or said first, said second, or said third control channel, or a fourth pre-defined data link protocol or a fourth control channel;
accumulating, by said at least one processor of the second system, and processing said one or more second incoming digital audio stream samples according to said fourth preprogrammed set of rules, or a ninth preprogrammed set of rules;
decompressing, by said at least one processor of the second system, said one or more of said second incoming digital audio sample streams according to a second preprogrammed decompression algorithm as defined by said fourth or said ninth preprogrammed set of rules into second decompressed digital audio samples;

accumulating, by said at least one processor of the second system, said second decompressed digital audio samples into a second buffer according to a second jitter buffer threshold, wherein said second jitter buffer threshold is defined by said fourth or said ninth preprogrammed set of rules; and regenerating, by said at least one processor of the second system, second outgoing audio frequency signals based on said second decompressed digital audio samples.

23. The method of claim 22, wherein said first system and the second system are at least one of:
   at a single location, or
   at different locations.

24. The method of claim 22, further comprising:
   using at least one of:
      predetermined information, or
      learned information, or
      preconfigured information,
   in determining at least one of said first, or said second, or said third, or said fourth preprogrammed rules to apply to processing, by said at least one processor of said first system or the second system, said first or said second signal information and forwarding of messages between said first and the second systems.

25. The method of claim 22, further comprising:
   using a control channel comprising at least one of:
      using an in-band control channel, or
      using an out-of-band control channel,
   said using said in-band, or out-of-band control channel comprising:
      remotely managing, by said at least one processor of said first system or the second system, said first and the second systems, and
      wherein said using said control channel comprises:
         providing, by said at least one processor of said first system or the second system, communications performing at least one of:
            providing, by said at least one processor of said first system or the second system, a monitoring function; or
            providing, by said at least one processor of said first system or the second system, a control function; or
            determining, by said at least one processor of said first system or the second system, real time diagnostic information; or
            determining, by said at least one processor of said first system or the second system, status information; or
            determining, by said at least one processor of said first system or the second system, ancillary information.

26. The method of claim 20, further comprising:
   compressing, and
   decompressing,
by said at least one processor of at least one of said first system or the second system, at least one of:
   PSTN-compatible, or
   VoIP-compatible, or
   High Definition Voice-compatible
audio signals.

27. The method according to claim 20, wherein said creating comprises using said first control channel, and further comprising:

establishing said first control channel between said first system, and said second system, in advance of processing said one or more first incoming audio frequency signals, comprising:
   setting up at least one voice trunk as soon as said first system and said second system are switched on, wherein said first control channel is ready when a first call is made, providing for faster call connect, and greater efficiency than absent said establishing.

28. The method according to claim 20, wherein said creating comprises using said first control channel, and further comprising:
   waiting for receipt of a first call, and
   upon said receipt of said first call,
      establishing said first control channel between said first system, and said second system, based on real time call requirements of said first call, to allow processing said one or more first incoming audio frequency signals; and
   wherein said first control channel comprises, depending on
      preprogrammed criteria, either one of:
         becoming permanently established; or
         becoming temporarily established.

29. The method according to claim 20, further comprising:
   connecting or coupling said first system and said second system, simultaneously to one another, creating a mesh network.

30. The method according to claim 20, wherein the packet data network comprises any one or more of:
   a wired network;
   a wireless network;
   an optical network;
   a fiber network;
   a satellite network;
   a 4G wireless network;
   a 5G wireless network;
   a 6G wireless network;
   an n-G wireless network;
   a Long-Term Evolution (LTE) network;
   a wireless LTE network;
   a GSM/EDGE network;
   a UMTS/HSPA network;
   a CDMA2000 network;
   a 4G LTE network;
   a 3G or 3GPP network;
   a WiMAX network;
   an evolved high speed packet access network;
   an LTE Advanced network;
   a WiMAX-Advanced network;
   a True 4G network;
   an IMT-Advanced network;
   an LTE Time-Division Duplex (LTE-TDD) network;
   an LTE Frequency-Division Duplex (LTE-FDD) network;
   a Voice over LTE (VoLTE) network;
   a Circuit-switched fallback (CSFB) network;
   a Simultaneous voice and LTE (SVLTE) network; or
   a Single Radio Voice Call Continuity (SRVCC) network.

31. A nontransitory computer machine-readable medium that provides instructions, which when executed by a computer processor of a computing platform, causes the computing platform to perform operations comprising a method offor transmitting and receiving audio frequency signals comprising PSTN-compatible, or voice over IP (VoIP) signals, or high definition voice signals over a packet data network wherein the packet data network comprises a software defined wide area network (SDWAN), the method comprising:
receiving, by at least one processor of a first system, one or more first incoming audio frequency signals,
wherein said at least one processor of said first system comprises at least one or more of:
at least one application-specific integrated circuit (ASIC),
at least one chipset,
at least one processor,
at least one microprocessor,
at least one logic circuit,
at least one quantum computer,
at least one multi-core processor,
at least one quad core processor,
at least one programmable logic device (PLD),
at least one field programmable gate arrays (FPGA),
at least one information appliance,
at least one system on a chip (SOC),
at least one multi-processor,
at least one computer processor,
at least one graphics processor, or
at least one digital signal processor (DSP);
digitizing, by said at least one processor of said first system, said one or more first incoming audio frequency signals according to an audio standard obtaining first digitized audio frequency signals;
segmenting, by said at least one processor of said first system, said first digitized audio frequency signals to generate one or more first sequences of audio signal samples, each of said one or more first sequences of audio signal samples comprising a first preprogrammed sample size;
compressing, by said at least one processor of said first system, said each of said one or more first sequences of audio signal samples according to a first preprogrammed set of rules comprising using a first preprogrammed compression algorithm, producing a first sequence of one or more strings of processed samples, responsive to determining that said each of said one or more first sequences of audio signal samples is determined to meet a first preprogrammed criteria for compression according to said first preprogrammed set of rules;
accumulating, by said at least one processor of said first system, said first sequence of said one or more strings of processed samples creating a first group of samples ready for transmission according to a first aggregation threshold defined by a second preprogrammed set of rules;
creating a first outgoing digital message from said first group of samples ready for transmission according to a forwarding threshold defined by a third preprogrammed set of rules, using at least one of:
a first pre-defined data link protocol, or
a first control channel;
transmitting, by said at least one processor of said first system, said first outgoing digital message over the software defined wide area network to a second system;
receiving, by said at least one processor of said first system, from the software defined wide area network, and interpreting, by said at least one processor of said first system, a first incoming digital message from the second system;
processing said first incoming digital message into one or more incoming digital audio stream samples according to said third pre-programmed set of rules comprising said first pre-defined data link protocol, or said first control channel, or a second pre-defined data link protocol, or a second control channel; and
accumulating and processing said one or more incoming digital audio stream samples according to a fourth preprogrammed set of rules comprising being configured to:
decompressing any compressed of said one or more incoming digital audio stream samples according to a first preprogrammed decompression algorithm defined by said fourth preprogrammed set of rules into decompressed digital audio samples;
accumulating said first decompressed digital samples into a first buffer according to a first jitter buffer threshold, wherein said first jitter buffer threshold is defined by said fourth preprogrammed set of rules; and
regenerating, by said at least one processor of said first system, first outgoing audio frequency signals based on said first decompressed digital audio samples.

32. The nontransitory computer machine-readable medium of claim 31, wherein the method comprises: performing functions of said first system and the second system at least one of: at a single location, or at different locations.

33. The nontransitory computer machine-readable medium of claim 31, wherein the software defined wide area network comprises an LTE software defined wide area network.

34. The nontransitory computer machine-readable medium of claim 31, wherein the method further comprises:
receiving, by at least one processor of the second system, one or more second incoming audio frequency signals;
digitizing, by said at least one processor of the second system, said one or more second incoming audio frequency signals according to an audio standard obtaining second digitized audio frequency signals;
segmenting, by said at least one processor of the second system, said second digitized audio frequency signals generating one or more second sequences of audio signal samples, each of said one or more second sequences of said audio signal samples comprising said first preprogrammed sample size or a second preprogrammed sample size;
compressing said each of said one or more second sequences of audio signal samples according to said first preprogrammed set of rules or a fifth preprogrammed set of rules comprising said first preprogrammed compression algorithm or a second preprogrammed compression algorithm, producing a second sequence of one or more strings of processed samples, responsive to determining that said each of said one or more second sequences of audio signal samples is determined to meet said first or a second preprogrammed criteria for compression according to said first or said fifth preprogrammed set of rules;
accumulating, by said at least one processor of the second system, said second sequence of said one or more strings of processed samples, creating a second group of samples ready for transmission according to said first aggregation threshold, or a second aggregation threshold defined by a sixth preprogrammed set of rules;
creating a second outgoing digital message from said second group of samples ready for transmission according to said forwarding threshold, or a second forwarding threshold defined by a seventh preprogrammed set of rules, wherein said second outgoing digital message for transmission is created using said first or said second pre-defined data link protocol, or said first or said second control channel, or a third pre-defined data link protocol, or a third control channel;

transmitting, by said at least one processor of the second system, said second outgoing digital message over the software defined wide area network to said first system;

receiving, by said at least one processor of the second system, at the second system from the software defined wide area network, and interpreting, by said at least one processor of the second system, a second incoming digital message from said first system; and processing, by said at least one processor of the second system, said second incoming digital message into one or more second incoming digital audio stream samples according to said third preprogrammed set of rules or an eighth preprogrammed set of rules comprising said first, said second, or said third pre-defined data link protocol, or said first, said second, or said third control channel, or a fourth pre-defined data link protocol or a fourth control channel;

accumulating, by said at least one processor of the second system, and processing said one or more second incoming digital audio stream samples according to said fourth preprogrammed set of rules, or a ninth preprogrammed set of rules;

decompressing, by said at least one processor of the second system, said one or more of said second incoming digital audio sample streams according to a second preprogrammed decompression algorithm as defined by said fourth or said ninth preprogrammed set of rules into second decompressed digital audio samples;

accumulating, by said at least one processor of the second system, said second decompressed digital audio samples into a second buffer according to a second jitter buffer threshold, wherein said second jitter buffer threshold is defined by said fourth or said ninth preprogrammed set of rules; and regenerating, by said at least one processor of the second system, second outgoing audio frequency signals based on said second decompressed digital audio samples.

35. The nontransitory computer addressable medium according to claim 31, wherein the method comprises:
wherein said creating comprises using said first control channel, and further comprising:
establishing said first control channel between said first system, and said second system, in advance of processing said one or more first incoming audio frequency signals, comprising:
setting up at least one voice trunk as soon as said first system and said second system are switched on, wherein said first control channel is ready when a first call is made, providing for faster call connect, and greater efficiency than absent said establishing.

36. The nontransitory computer addressable medium according to claim 31, wherein the method comprises:
wherein said creating comprises using said first control channel, and further comprising:
waiting for receipt of a first call, and
upon said receipt of said first call,
establishing said first control channel between said first system, and said second system, based on real time call requirements of said first call, to allow processing said one or more first incoming audio frequency signals and
wherein said first control channel comprises, depending on
preprogrammed criteria, either one of:
becoming permanently established; or
becoming temporarily established.

37. The nontransitory computer accessible medium according to claim 31, wherein the method further comprises:
connecting or coupling said first system and said second system, simultaneously to one another, creating a mesh network.

38. The nontransitory computer accessible medium according to claim 31, wherein the packet data network comprises any one or more of:
a wired network;
a wireless network;
an optical network;
a fiber network;
a satellite network;
a 4G wireless network;
a 5G wireless network;
a 6G wireless network;
an n-G wireless network;
a Long-Term Evolution (LTE) network;
a wireless LTE network;
a GSM/EDGE network;
a UMTS/HSPA network;
a CDMA2000 network;
a 4G LTE network;
a 3G or 3GPP network;
a WiMAX network;
an evolved high speed packet access network;
an LTE Advanced network;
a WiMAX-Advanced network;
a True 4G network;
an IMT-Advanced network;
an LTE Time-Division Duplex (LTE-TDD) network;
an LTE Frequency-Division Duplex (LTE-FDD) network;
a Voice over LTE (VoLTE) network;
a Circuit-switched fallback (CSFB) network;
a Simultaneous voice and LTE (SVLTE) network; or
a Single Radio Voice Call Continuity (SRVCC) network.

* * * * *